(12) United States Patent
Smith et al.

(10) Patent No.: US 11,836,721 B2
(45) Date of Patent: Dec. 5, 2023

(54) PROTECTION OF INFORMATION IN AN INFORMATION EXCHANGE

(71) Applicant: INTEL CORPORATION, Santa Clara, CA (US)

(72) Inventors: Ned M. Smith, Beaverton, OR (US); Rajesh Poornachandran, Portland, OR (US); Michael Nolan, Maynooth (IE); Simon N. Peffers, Action, ME (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 16/024,676

(22) Filed: Jun. 29, 2018

(65) Prior Publication Data

US 2019/0043050 A1    Feb. 7, 2019

(51) Int. Cl.
*G06Q 20/40* (2012.01)
*G06Q 20/22* (2012.01)
(Continued)

(52) U.S. Cl.
CPC ....... *G06Q 20/401* (2013.01); *G06F 16/2379* (2019.01); *G06Q 20/223* (2013.01); (Continued)

(58) Field of Classification Search
CPC ... H04L 9/3297; H04L 9/3239; H04L 9/0643; H04L 9/0637; H04L 2209/805; H04L 2209/56; H04L 2209/38; H04L 9/50; G06Q 2220/00; G06Q 20/4016; G06Q 20/401; G06Q 20/223; G06Q 20/389; G06F 16/2379; G06F 2221/2151; G06F 21/64; H04W 56/001–56/0015
(Continued)

(56) References Cited

U.S. PATENT DOCUMENTS 6,671,821 B1 * 12/2003 Castro ................... G06F 21/577
714/4.3
7,519,865 B1 †  4/2009 Maly
(Continued)

FOREIGN PATENT DOCUMENTS

WO      2020005452      1/2020

OTHER PUBLICATIONS

Mani, Sathiya & Durairajan, Ramakrishnan & Barford, Paul & Sommers, Joel., A System for Clock Synchronization in an Internet of Things. , Jun. 2018 (Year: 2018).*
(Continued)

*Primary Examiner* — James D Nigh
(74) *Attorney, Agent, or Firm* — Schwegman Lundberg & Woessner, P.A.

(57) ABSTRACT

In some examples, an apparatus uses a blockchain to agree on a time in an information exchange network. A first node includes a processor communicatively coupled to a storage device including instructions. When executed by the processor, the instructions cause the processor to verify a time estimate from each of one or more other node, to determine a time match of a time estimate of the first node with the time estimates from the one or more other node, and if the time match is determined, to commit to the blockchain a transaction that includes a time stamp.

22 Claims, 13 Drawing Sheets

(51) Int. Cl.
  *G06Q 20/38* (2012.01)
  *H04L 9/06* (2006.01)
  *H04L 9/32* (2006.01)
  *H04W 56/00* (2009.01)
  *G06F 16/23* (2019.01)
  *H04L 9/00* (2022.01)
  *G06F 21/64* (2013.01)

(52) U.S. Cl.
  CPC ....... *G06Q 20/389* (2013.01); *G06Q 20/4016* (2013.01); *H04L 9/0637* (2013.01); *H04L 9/0643* (2013.01); *H04L 9/3239* (2013.01); *H04L 9/3297* (2013.01); *H04W 56/001* (2013.01); *G06Q 2220/00* (2013.01); *H04L 9/50* (2022.05); *H04L 2209/56* (2013.01); *H04L 2209/805* (2013.01)

(58) Field of Classification Search
  USPC .......................................................... 705/75
  See application file for complete search history.

(56) References Cited

U.S. PATENT DOCUMENTS

| | | | |
|---|---|---|---|
| 10,484,346 B2* | 11/2019 | Russinovich | G06Q 20/3829 |
| 10,505,723 B1* | 12/2019 | Griffin | H04L 9/30 |
| 2004/0005902 A1* | 1/2004 | Belcea | H04W 56/0015 455/502 |
| 2004/0193881 A1 | 9/2004 | Yasushi et al. | |
| 2007/0047591 A1* | 3/2007 | Senthilnathan | H04L 1/08 370/503 |
| 2011/0040976 A1 | 2/2011 | Yairi et al. | |
| 2013/0232308 A1† | 9/2013 | Yairi et al. | |
| 2014/0281037 A1† | 9/2014 | Spada et al. | |
| 2014/0334582 A1* | 11/2014 | Bock | G06F 1/12 375/356 |
| 2016/0259923 A1* | 9/2016 | Papa | H04W 12/35 |
| 2016/0292680 A1* | 10/2016 | Wilson, Jr. | G06Q 20/40 |
| 2017/0048235 A1* | 2/2017 | Lohe | G06Q 20/10 |
| 2017/0075938 A1 | 3/2017 | Black et al. | |
| 2017/0085555 A1* | 3/2017 | Bisikalo | H04L 9/3236 |
| 2017/0126702 A1* | 5/2017 | Krishnamurthy | H04L 63/123 |
| 2017/0134937 A1* | 5/2017 | Miller | G06Q 20/3829 |
| 2017/0221052 A1* | 8/2017 | Sheng | G06Q 20/3829 |
| 2017/0230189 A1† | 8/2017 | Toll et al. | |
| 2017/0352012 A1* | 12/2017 | Hearn | G06Q 20/02 |
| 2017/0374049 A1† | 12/2017 | Ateniese et al. | |
| 2018/0019993 A1* | 1/2018 | Kravitz | H04L 9/3236 |
| 2018/0101560 A1* | 4/2018 | Christidis | H04L 9/3236 |
| 2018/0121909 A1 | 5/2018 | Christidis et al. | |
| 2018/0152442 A1* | 5/2018 | Buldas | H04L 9/3247 |
| 2018/0198626 A1* | 7/2018 | Kroonmaa | H04L 9/0637 |
| 2018/0218176 A1* | 8/2018 | Voorhees | H04L 9/3213 |
| 2018/0285838 A1* | 10/2018 | Franaszek | G06Q 20/42 |
| 2018/0310174 A1* | 10/2018 | Rougier | H04W 12/06 |
| 2018/0337769 A1* | 11/2018 | Gleichauf | H04L 9/3247 |
| 2018/0348376 A1* | 12/2018 | Derbez | G01S 19/27 |
| 2019/0018863 A1* | 1/2019 | Wu | G06F 16/27 |
| 2019/0034892 A1 | 1/2019 | Smith et al. | |
| 2019/0208422 A1* | 7/2019 | Haleem | H04L 9/12 |
| 2019/0238316 A1* | 8/2019 | Padmanabhan | G06N 20/00 |
| 2019/0246276 A1* | 8/2019 | Lingala | H04W 56/001 |
| 2019/0279210 A1* | 9/2019 | Pen | H04L 9/0637 |
| 2019/0287099 A1* | 9/2019 | Tan | G06F 16/2379 |
| 2019/0370250 A1* | 12/2019 | Tipton | G06Q 20/401 |
| 2019/0370806 A1* | 12/2019 | Wang | G06F 16/24 |
| 2020/0067697 A1* | 2/2020 | Puddu | G06F 21/602 |
| 2020/0162264 A1* | 5/2020 | Zamani | H04L 9/3297 |
| 2020/0167773 A1* | 5/2020 | Cervenka | G06Q 20/38 |
| 2020/0177604 A1* | 6/2020 | Wei | H04L 63/0442 |
| 2020/0186354 A1* | 6/2020 | Balinsky | H04L 9/3247 |
| 2020/0186361 A1* | 6/2020 | Almgren | H04L 9/3242 |
| 2020/0267003 A1* | 8/2020 | Ebrahimi | G06Q 20/3827 |

OTHER PUBLICATIONS

Dalwadi, Neha; Padole, Mamta., Comparative Study of Clock Synchronization Algorithms in Distributed Systems, 2017, p. 1941-1952 (Year: 2017).*

Narayanan, Arvind ; Bonneau, Joesph; et. al., Bitcoin and Cryptocurrency Technologies., Jul. 2016, See Ch. 3 "Mechanics of Bitcoin." (citing to Draft Feb. 2016, available from authors at https://bitcoinbook.cs.princeton.edu/) (Year: 2016).*

Wang, Jie, and Kissel, Zachary A., Introduction to Network Security : Theory and Practice., 2015, See Ch. 4 "Data Authentication" (Year: 2015).*

Sonalker, Anuja., Designing Robust Collaborative Services In Distributed Wireless etworks., 2007, 93-96, 111-12 (Year: 2007).*

Marzullo, Keith; Owicki Susan., Maintaining the Time in a Distributed System., Aug. 1983 (Year: 1983).*

NTP Architecture, Protocol and Algorithms. David L. Mills, University of Delaware. Jul. 22, 2007. https://www.eecis.udel.edu/~mills/database/brief/arch/arch.pdf Accessed via Network Time Synchronization Research Project link at http://www.ntp.org/ (Year: 2007).*

Marzullo, Keith; Owicki Susan. PODC '83: Proceedings of the second annual ACM symposium on Principles of distributed computing (Aug. 1983). Maintaining the Time in a Distributed System. p. 295-303, 296 (available via https://dl.acm.org/doi/abs/10.1145/800221.806730). (Year: 1983).*

W. Meng, E. W. Tischhauser, Q. Wang, Y. Wang and J. Han, "When Intrusion Detection Meets Blockchain Technology: A Review," in IEEE Access, vol. 6, pp. 10179-10188, 2018, doi: 10.1109/ACCESS. 2018.2799854. https://ieeexplore.ieee.org/document/8274922?source=IQplus (Year: 2018).*

Bonnecaze et al. "Improving Time Stamping Schemes: A Distributed Point of View", Sep. 5, 2005, 13 pages (Year: 2005).*

International Search Report for related PCT Application Serial No. PCT/US 2019/034513 dated Oct. 7, 2019, 3 pages.

Smith et al.: "Competitive Online Data Market and Exchange Network"; U.S. Appl. No. 15/720,514, filed Sep. 29, 2017, not yet published.

"International Application Serial No. PCT US2019 034513, International Preliminary Report on Patentability dated Jan. 7, 2021", 9 pgs.

"European Application Serial No. 19824915.3, Extended European Search Report dated Apr. 8, 2022", 6 pgs.

"European Application Serial No. 19824915.3, Response filed Nov. 4, 2022 to Extended European Search Report dated Apr. 8, 2022", 8 pgs.

* cited by examiner
† cited by third party

400

700

PROTECTION OF INFORMATION IN AN INFORMATION EXCHANGE

TECHNICAL FIELD

Embodiments described herein relate generally to Internet of Things (IoT) devices, including, for example, IoT devices included in IoT systems. Embodiments described herein also relate to protection of information in an information exchange, and to techniques applied within IoT devices and IoT device networks.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the Internet of Things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. IoT devices have become more popular and applications using these devices have proliferated.

Various specifications have been proposed to more effectively interconnect and operate IoT devices and IoT network use cases. These include the specialization of communication specifications distributed by groups such as the Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
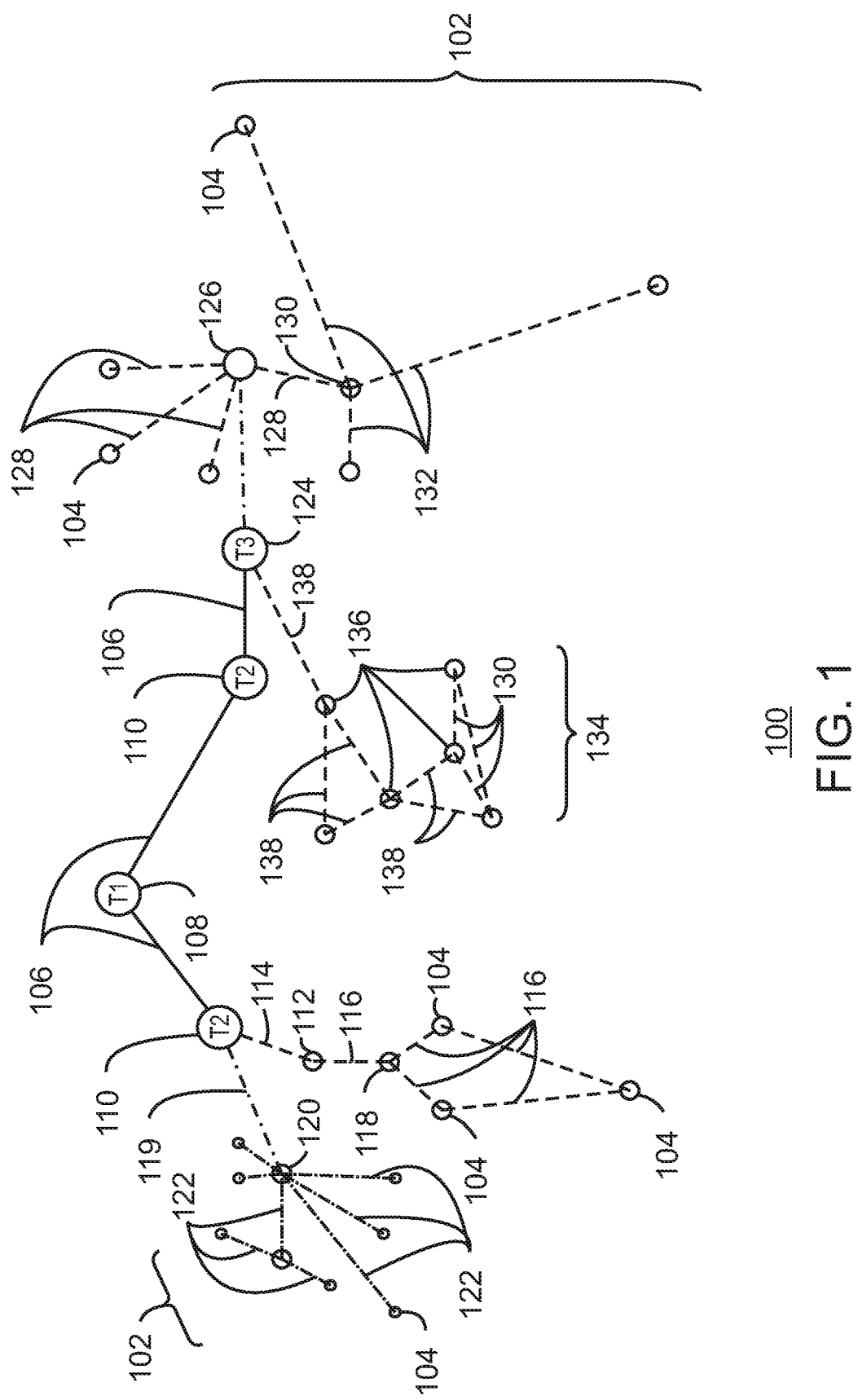
FIG. 1 illustrates interconnections that may be present in the Internet in accordance with some embodiments.

In a multi-sided data exchange or information exchange (IE) that involves multiple data players such as, for example, one or more producer, consumer, provider, and owner, data as an electronic asset (e-asset) can potentially be exchanged multiple times throughout a data lifecycle. A key challenge can be how to enforce prevention of information dilution over time. Information exchange can facilitate distribution and sharing of data assets. As the group of knowers of the data asset information increases, the value of the data asset may decrease, since those knowing the information have first mover advantage in order to capitalize on the information. The value of an e-asset (that is, data) can be based on a dilution potential of the e-asset in an information exchange (IE).

As data is exchanged and/or traded across multiple participants, in accordance with some embodiments, a time stamp may be bound to data in a tamper resistant manner. Appropriate secure data use and disclosure controls may be applied so that data remains effective for monetization, loyalty, provenance, and auditability purposes. Such secure data use and disclosure controls can be particularly important where participating platforms are heterogeneous in terms of a mechanism used to find agreement regarding time-based data degradation. Some embodiments include trusted time capabilities that are used to coordinate a consensus trusted time. In this manner, an electronic market (e-market) can preserve value where data may be time sensitive and/or circulation sensitive. Some embodiments include distributed time management using blockchain (DTMB) that can address challenges in an Information Exchange (IE). Some embodiments include DTMB that performs an interaction using backchain for secure time agreement. Some embodiments provide tamper resistant secure time management across multiple data players (for example, producer, owner, facilitator, orchestrator, consumer, regulatory agent, etc.) to track usage and information degradation over time.

Some embodiments relate to using a blockchain to agree on a current time. Each blockchain node (for example, each blockchain compute node) can include in its transaction block an estimation of current time. Blockchain technology can be used in some embodiments to process transactions in a data exchange (or information exchange). According to some embodiments, secure time stamp synchronization between data players (nodes) can be implemented. Secure time stamps can be used and enforced across participants in the information exchange, and distributed ledger transactions can be used as tamper resistant audit trails (for example, for regulatory bodies).

Some embodiments are system agnostic. For example, some embodiments can be related to using blockchain to agree on a current time over a variety of networks, including IoT networks of IoT devices, wired networks and/or wireless networks. For example, some embodiments can be implemented using LoRaWAN™ (Long Range Wide Area Network), WiFi, Ethernet, cellular, or other transmission protocols, including any combination thereof, among others. Some embodiments are wired and/or wireless protocol agnostic.

FIGS. 1-5 include example operating environments such as Internet of Things (IoT) environments which may utilize principles described herein. The example operating environments of FIGS. 1-5 may utilize principles of data fragmentation and/or data recombination as described herein and illustrated in the accompanying drawings (for example, data fragmentation and/or data recombination for fog networks, edge networks, foglets, etc.)

The Internet of Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like, among others. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted, for example, in FIGS. 1 and 2.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118 (for example, a central compute node 118). The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWAN™ (Long Range Wide Area Network) specification promulgated by the LoRa Alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 13.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

Figure 2:
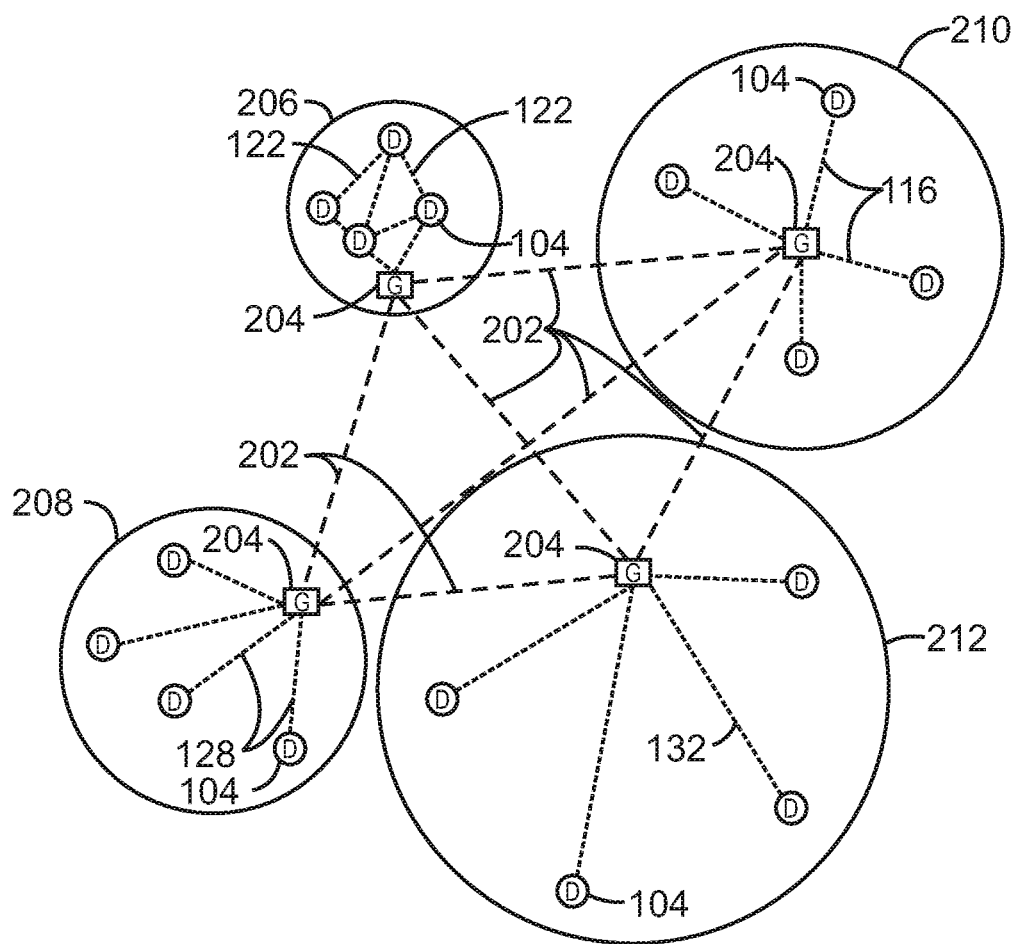
FIG. 2 illustrates a network topology for a number of Internet of Things (IoT) networks coupled through backbone links to gateways in accordance with some embodiments.

FIG. 2 is a simplified drawing of a topology 200 (for example, a network topology and/or a domain topology) that may be used for a number of Internet of Things (IoT) networks including IoT devices 104. IoT networks 206, 208, 210 and 212 can be coupled through backbone links 202 to gateways 204 in accordance with some embodiments. Like numbered items are as described with respect to FIG. 1. Further, to simplify the drawing, not every device 104, or communications link (for example, link 116, 122, 128, or 132) is labeled. A number of IoT devices 104 may communicate with a gateway 204, and with each other through a gateway 204. The backbone links 202 may include any number of wired or wireless technologies, including optical networks, and may be part of a local area network (LAN), a wide area network (WAN), or the Internet. Additionally, such communication links can facilitate optical signal paths among both IoT devices 104 and gateways 204, including the use of multiplexing (MUX) and/or demultiplexing (DEMUX) components that facilitate interconnection of the various devices.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth low energy (BLE) links 122. Other types of IoT networks that may be present include a wireless local area network (WLAN) 208 that may be used to communicate with IoT devices 104 through IEEE 802.11 (Wi-Fi®) links 128, a cellular network 210 that may be used to communicate with IoT devices 104 through an LTE/LTE-A (4G) or 5G cellular network, and a low-power wide area (LPWA) network 212. Network 212 may be, for example, an LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (for example, a tier 2 or tier 3 provider) using any number of communication links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms a cluster tree of linked devices and networks.

Each of these IoT networks may provide opportunities for new technical features, such as those as described herein. The improved technologies and networks may enable exponential growth of devices and networks, including use of IoT networks into fog devices or systems. As use of such improved technologies grows, IoT networks may be developed for self-management, functional evolution, and collaboration, without needing direct human intervention. Improved technologies may enable IoT networks to function without a centralized control system. Accordingly, improved technologies such as those described herein may be used to automate and enhance network management and operation functions far beyond current implementations.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous network infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

IoT networks may be further enhanced by the integration of sensing technologies, such as sound, light, electronic traffic, facial and pattern recognition, smell, and vibration, into the autonomous organizations among the IoT devices. The integration of sensory systems may allow systematic and autonomous operation, communication and coordination of service delivery against contractual service objectives, orchestration and quality of service (QoS). Distributed control can support swarming and fusion of resources, which can be important aspects of a distributed information market.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each.

Furthermore, the proper components of infrastructure and resource based trust and service indices may be inserted to improve the data integrity, quality assurance, and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Each of the IoT devices 104 may include an appropriate transceiver for wide area communications with that device. Each IoT device 104 may also include other transceivers for communications using additional protocols and frequencies.

Figure 3:
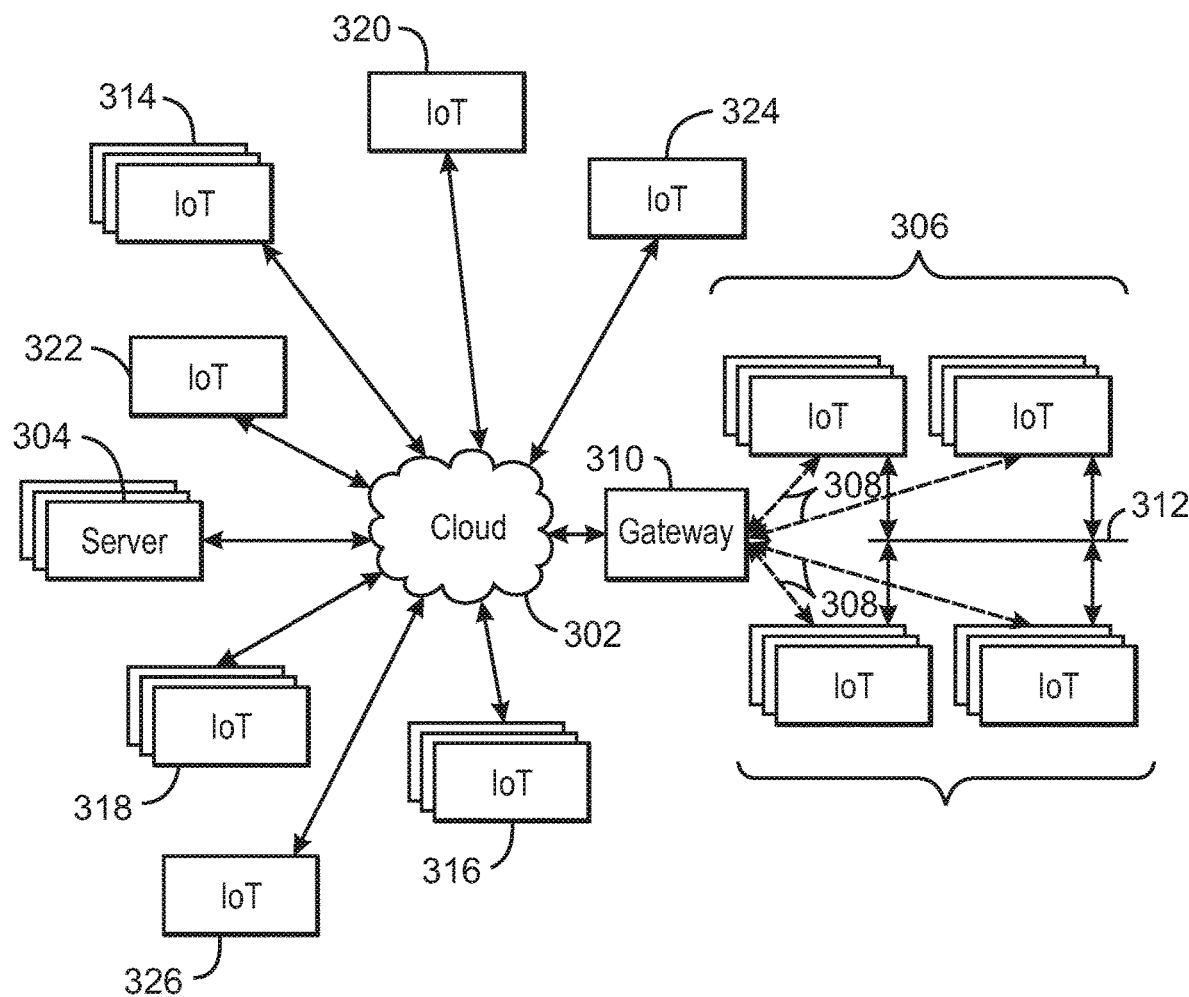
FIG. 3 illustrates a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
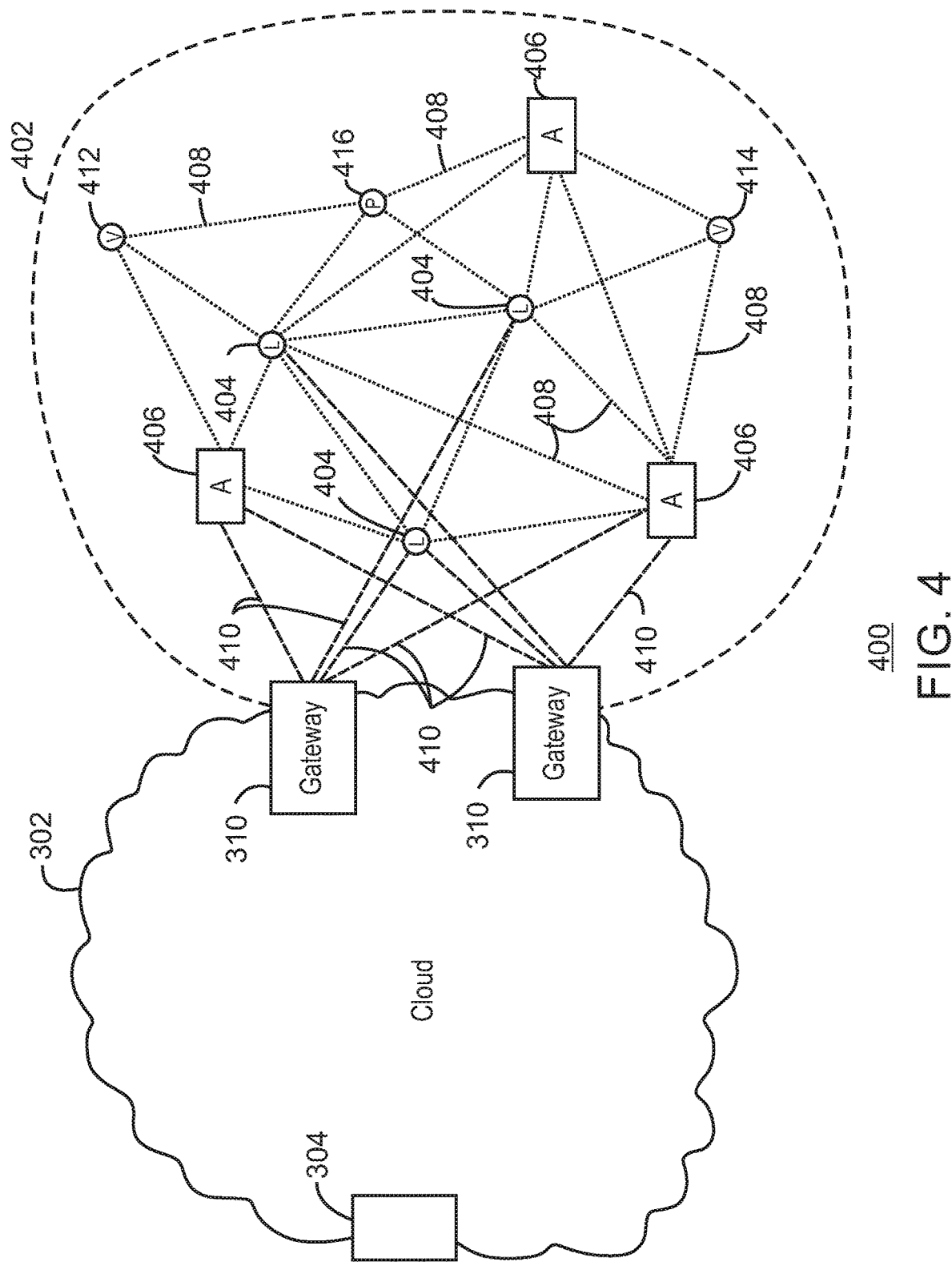
FIG. 4 illustrates a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices operating as a fog device 402 at the edge of the cloud 302 in accordance with some embodiments. Like numbered items are as described with respect to FIG. 3. As used herein, a fog device 402 may be a cluster of devices that may be grouped to perform a specific function, such as traffic control, weather control, plant control, and the like. A mesh network of IoT devices may be termed a fog 402 operating at the edge of the cloud 302.

The fog 402 may be considered to be a massively interconnected network in which a number of IoT devices are in communication with each other (for example, via radio links). The interconnected network may be facilitated using, for example, an interconnect specification released by the Open Connectivity Foundation™ (OCF), which allows devices to discover each other and establish communications for interconnects. Other interconnection protocols may be used, including, for example, the optimized link state routing (OLSR) protocol, the better approach to mobile ad-hoc networking (B.A.T.M.A.N.) routing protocol, or the OMA Lightweight M2M (LWM2M) protocol, among others.

IoT devices that may be included include, for example, gateways 310, data aggregators 406, and sensors 404, 412, 414, 416, although any combinations of IoT devices and functionality may be used. Gateways 310 may be edge devices that provide communications between cloud 302 and the fog 402, and may also provide backend process functionality for data obtained from sensors (for example, such as motion data, flow data, temperature data, and the like, among others). Data aggregators 406 may collect data from any number of the sensors and perform back end processing function for analysis. The results, raw data, or both may be passed along to the cloud 302 through the gateways 310. The sensors 404, 412, 414, 416 may be full IoT devices capable of both collecting data and processing the data, for example. In some embodiments, sensors 404, 412, 414, 416 can be more limited in functionality, for example, collecting the data and allowing the data aggregators 406 or gateways 310 to process the data.

Communications from any of the IoT devices may be passed along a convenient path (for example, a most convenient path) between any of the IoT devices to reach the gateways 310. In some examples, a number of interconnections can provide substantial redundancy, allowing communications to be maintained even with a loss of a number of IoT devices. Further, use of a mesh network can allow IoT devices to be used that are very low power or located at a distance from infrastructure, as the range to connect to another IoT device may be much less than a range to connect to the gateways 310.

In some examples, the fog device 402 includes a group of IoT devices such as, for example, IoT devices 412, 414, and 416 at particular locations. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as IoT devices 404 and data aggregators 406 in this example. The fog device 402 can leverage the combined processing and network resources that the collective of IoT devices provides. Accordingly, a fog device 402 may be used for any number of applications including, for example, financial modeling, weather forecasting, seismic measurement, traffic analyses, security monitoring, and the like.

For example, data may be uploaded to the cloud 302, and commands received from the cloud 302, through gateways 310 that are in communication with the IoT devices 404, 412, 414, 416 and the aggregators 406 through the mesh network.

Any number of communications links may be used in the fog device 402. Shorter-range links 408, for example, compatible with IEEE 802.15.4 may provide local communications between the IoT devices. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection and operability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in some embodiments of system 400, three transient IoT devices 412, 414, and 416 have joined the fog device 402. In these cases, the IoT device may be built into the IoT devices, or may be an app on a smart phone carried by a person. Other IoT devices may also be present, such as IoT devices in moving computers located in vehicles such as automobiles or drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, IoT devices 404 may be wired so as to allow any one of the IoT devices 404 to provide control for any of the other IoT devices 404. The aggregators 406 may also provide redundancy in the control of the IoT devices 404 and other functions of the fog device 402.

In some examples, the fog 402 provided by the IoT devices may be presented to devices in the cloud 302, such as server 304, as a single device located at the edge of the cloud 302 (for example, as a fog device). Alerts coming from the fog device may be sent without being identified as coming from a specific IoT device within the fog device (for example, without being identified as coming from a specific IoT device 404, 406, 412, 414, 416 etc., but being identified as coming from fog device 402). In this manner, fog 402 may be considered a distributed platform that provides computing and storage resources to perform processing or data-intensive tasks such as data analytics, data aggregation, and/or machine-learning, among others.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures.

In some examples, a query from a user located, for example, at a server 304 about the operations of a subset of equipment monitored by the IoT devices 404, 406, 412, 414, 416, etc. may result in the fog device 402 selecting the IoT devices, such as particular sensors (for example, IoT device 404) among the IoT devices that are needed to answer the query. The data from these sensors may then be aggregated and analyzed by any combination of the IoT devices, including sensors (for example, 404), data aggregators (for example, 406), or gateways 310, before being sent on by the fog 402 device to the server 304 to answer the query. In this example, IoT devices in the fog 402 may select the sensors used based on the query, such as adding data from flow sensors or temperature sensors. Further, if some of the IoT devices in fog device 402 are not operational, other IoT devices in the fog device 402 may provide analogous data, if available. In some embodiments, the fog network 402 and cloud network 302 may be termed a sensor network.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Networks of devices may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 402 to function more efficiently with applications and services in the cloud 302. Accordingly, cloud 302 may be seen as a cloud or fog server running at the edge of a mobile network and performing tasks that may not be achieved with traditional network infrastructure. Machine-to-Machine gateway and control functions, such as the IoT device examples described with respect to FIGS. 3 and 4, are one example. In an MEC network, processing power, such as servers, are moved closer to the edge of networks. For example, the aggregators 406 located within the fog device 402 can provide processing power close to the edge.

Figure 5:
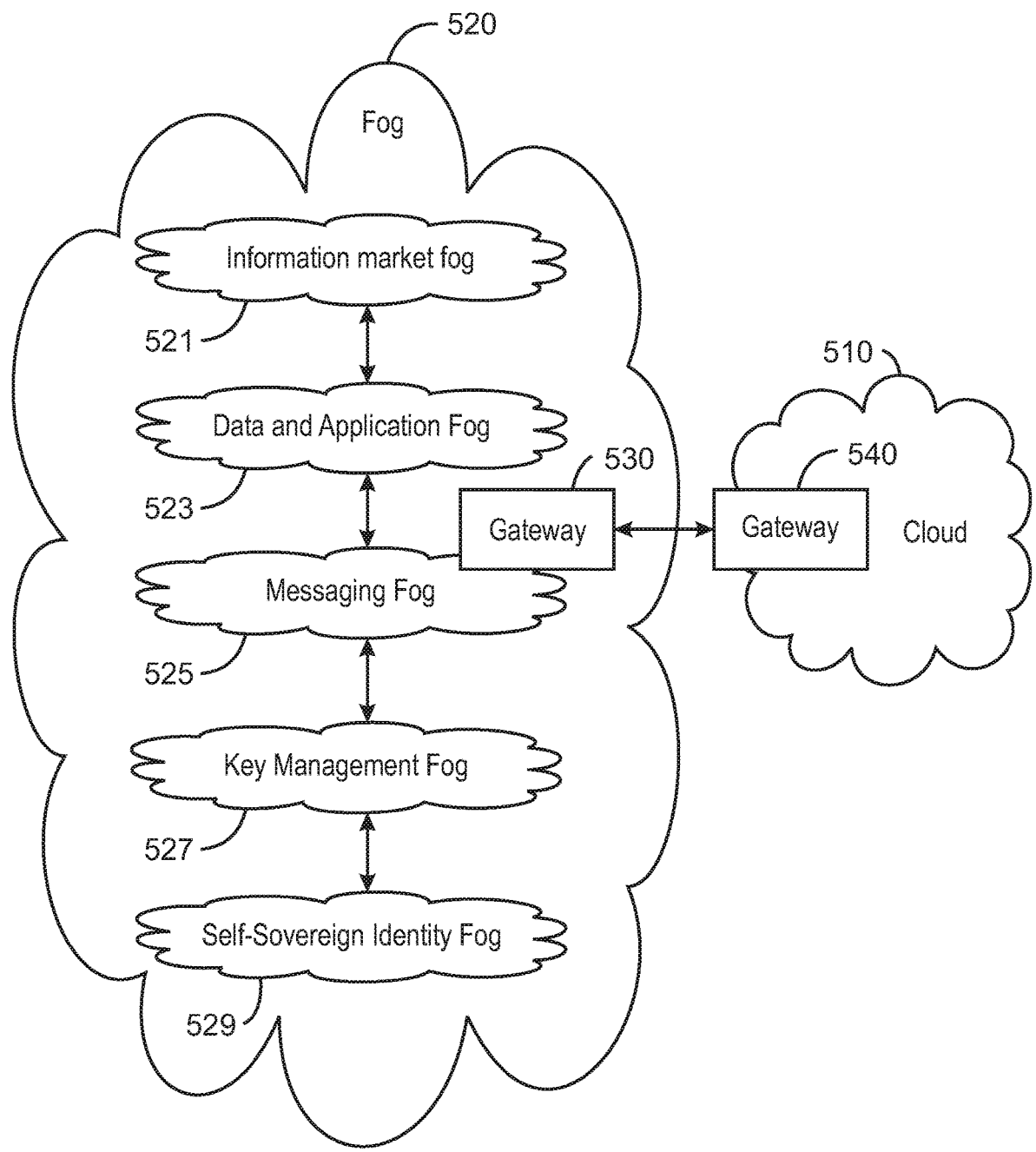
FIG. 5 illustrates layers of a cloud network with fog components beneath a distributed information market in accordance with some embodiments.

FIG. 5 illustrates layers of a cloud network with fog components beneath a distributed information market, according to an embodiment. For instance, cloud 510 may communicate with fog 520 via gateways 530 and 540. The fog 520 may refer to a network that operates behind a gateway 530, privately. Cloud 510 may have the same functional layers as the fog 520 but cloud layers may take place in public; that is, on a third party computer network, such as Amazon Web Services (AWS) available from Amazon.com.

In an embodiment, the information market as described herein may function exclusively in a cloud environment. But operation may be distributed across many blockchain nodes (for example, across many blockchain compute nodes) where each fog layer 521, 523, 525, 527 and 529 has the ability to coordinate and synchronize a distributed state according to one or more blockchain systems. This is also known as distributed byzantine agreement and fault-tolerant byzantine agreement.

The fog embodiment 402 (FIG. 4) may be realized using one or more of the following layers: the information market fog 521, the data and application fog 523, the messaging fog 525, the key management fog 527, or the self-sovereign identity fog 529 as shown. Cloud 302 (FIG. 3 or FIG. 4) may comprise similar layers, but are hosted on publicly visible hosting services. Another name for fog 520 may be "private cloud" or "distributed private cloud."

Figure 6:
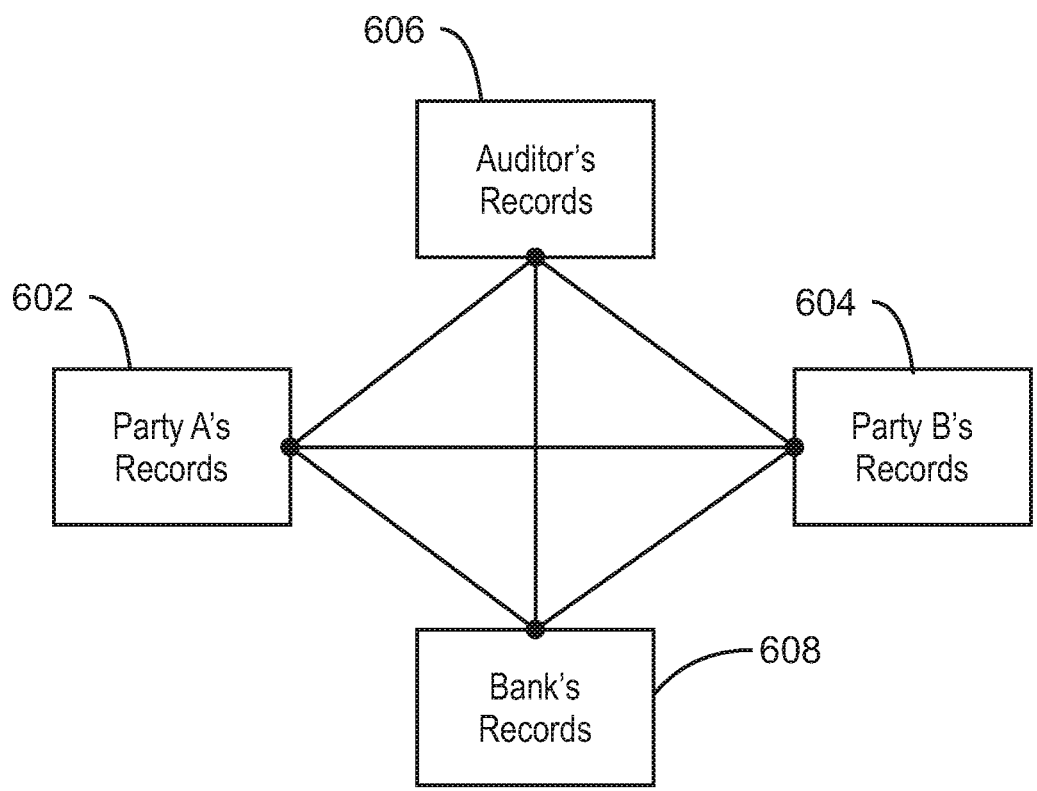
FIG. 6 illustrates a network in which transactions and assets can be recorded.

FIG. 6 illustrates a network 600 in which transactions and assets can be recorded, for example. Network 600 includes records 602 of a first party (party A), records 604 of a second party (party B), records 606 of an auditor, and records 608 of a bank. The participants in the network include party A, party B, the auditor, and the bank. These participants each keep their own ledgers and other records.

A blockchain (sometimes referred to as a block chain) is a continuously growing list of records, called blocks, which can be linked and secured using cryptography. Each block can contain a cryptographic hash of the previous block, a timestamp and transaction data. A blockchain can be resistant to modification of the data. It can be an open distributed ledger that can record transactions between parties efficiently and in a verifiable and permanent manner. A blockchain can be managed by a peer-to-peer network collectively adhering to a protocol for inter-node communication and validating new blocks. Once recorded, the data in a block cannot be altered retroactively without the alteration of all subsequent blocks.

Blockchains may be used to decentralize identification as they may provide agreement between devices regarding names and identities that are in current use. As used herein, a blockchain may be a distributed database of identity records that is made up of data structure blocks. Further, as used herein, the term blockchain may include any one or more of other distributed ledger systems. Other distributed ledger approaches include, for example, Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 7:
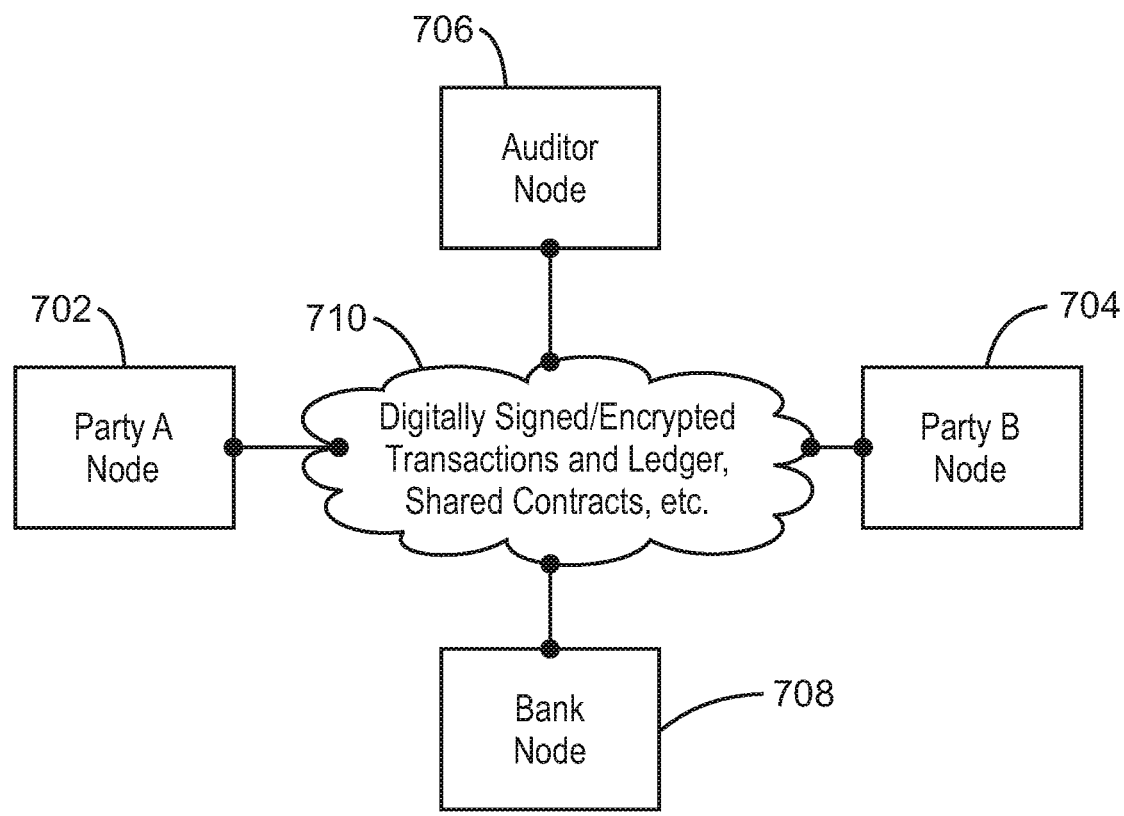
FIG. 7 illustrates a network using blockchain technology in accordance with some embodiments.

FIG. 7 illustrates a network 700 using blockchain technology in accordance with some embodiments. Network 700 includes party A node 702, party B node 704, auditor node 706, and bank node 708, in which blockchain technology provides the participants (party A, party B, auditor, and bank) to share a ledger of transactions that is digitally signed and encrypted. In some embodiments, nodes 702, 704, 706, and 708 can be compute nodes. The ledger can be updated through peer-to-peer replication each time a transaction occurs. This peer-to-peer replication can be implemented in a manner that each participant (nodes 702, 704, 706, and 708) in the network 700 can act as both a publisher and as a subscriber. Each node can receive or send transactions to other nodes, and the data is synchronized across the network 700 as it is transferred. Each of nodes 702, 704, 706, and 708 has a same replica of the ledger. Network 700 can eliminate duplication of effort, and reduce the need for intermediaries. Transactions can be secure, authenticated, and verifiable. Although network 700 is illustrated as a simple network with four nodes, in some embodiments, any number of nodes may be included. In some embodiments, the number of nodes can be increased over time.

Figure 8:
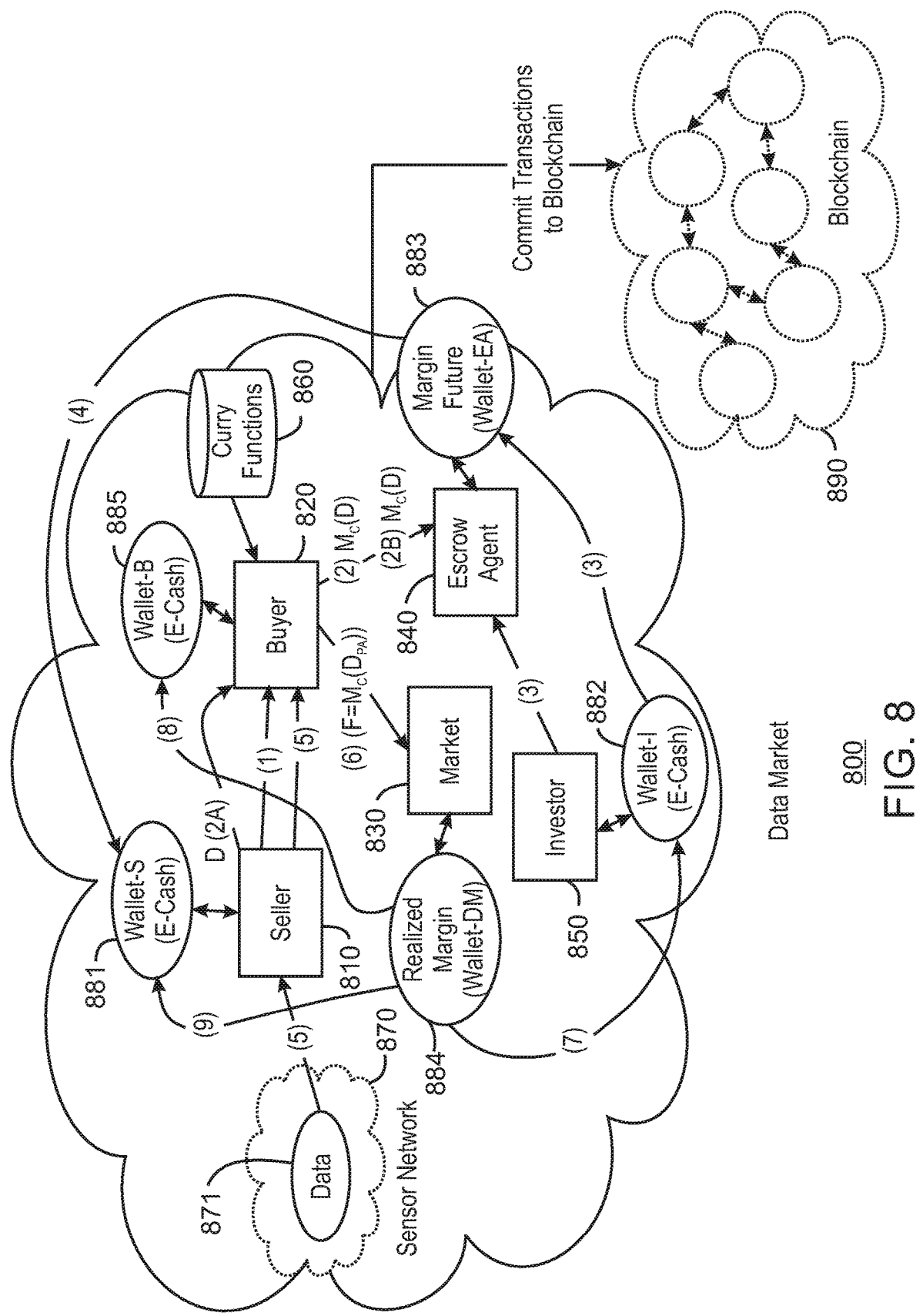
FIG. 8 illustrates exemplary architectures for implementing an online data market and exchange in accordance with some embodiments.

FIG. 8 illustrates an example competitive data market and exchange network 800 at a first layer, according to an embodiment. It should be noted that the data market and exchange network 800 may also be referred to as the "exchange," "data exchange," "information exchange", "information market", or "data market exchange" interchangeably, and for simplicity, herein. In an embodiment, data 871 collected in the sensor network 870 may be provided to, or collected by, a Seller 810. One Seller 810, one Buyer 820, and one Investor 850 are shown, but it will be understood that more than one Seller 810, Buyer 820, Investor 850, or other entity in exchange network 800 may be present. More than one Seller 810 may have access to data from one or more IoT networks in sensor network 870 for providing data to the exchange. More than one Buyer 820 may vie for exclusive or non-exclusive use of the data, etc. An example data or information network (or information exchange IE) may have three parts: (1) one or more Seller 810 comprising sensor networks, data networks, discrete devices, streaming data/media sources, etc. 870 that are equipped with IE technology for performing the Seller role; (2) one or more Buyer 820 comprising Buyer technology where Buyers have an algorithm or method for converting Seller data into marginal value (aka "Margin"); and (3) one or more Investors 850 who supply capital (e.g., in the form of e-currency) to the exchange 800 such that Buyers 820 may borrow from Investors 850 in order to pay Sellers 810. Investors 850 may receive interest in exchange for investment in Buyer's Margin.

Sellers 810 may incur costs related to the production of data 871 (information). In an example, a Seller 810 may receive raw information from the sensor network 870 and perform aggregation, analysis or other manipulation of the data 871 to add value. Buyers 820 may generate Margin by combining Seller data 871 with Margin algorithms (aka Currying); and Margin may be distributed among the Sellers 810, Investors 850, and Buyer 820 to pay costs, interest and profits.

An algorithm (or set of algorithms) that "Curry" the information supplied by Sellers 810 to form an information "Future" may be stored in a Curry function database 860. Information Futures may be traded as an investment within the information exchange 800.

In an embodiment, the information exchange 800 is implemented using blockchain technology 890. In an embodiment, a centralized model may be used where, for example, a streaming media provider such as YouTube™ video may leverage implementations to scale out to a multi-sided platform in a centralized fashion.

Advantages of the competitive data market and exchange network 800, as described herein, include being able to capture and retain more of the information market value than in other systems, thereby increasing the potential value of the exchange. Use of the Curry functions provides a quantifiable future estimate of the value, e.g., Margin Future, of the transformation of data into information with value added. Other markets do not employ the concept of Curry functions to improve margin estimate and return on investment for inflation. Embodiments may leverage the scaling of two-party margining to multi-sided data platforms, wherein content may change hands multiple times with "mash-up" of both data and Curry functions happening multiple times where product of mash-up is a higher value object, and where an object produced is an investment Future. Further, a blockchain-based distributed ledger may help minimize the transaction risk and improve public auditability on the transactions. Public auditability is especially significant in a multi-sided information exchange.

For example, a fictitious footwear retailer (e.g., "Shoes-R-Us") may have developed a Curry function f(x) that given a 360° three-dimensional (3D) image of a customer's foot dimensions may generate commands to produce a perfectly sized shoe using a 3D printer. The function input (x) may be obtained from a sensor network operated by a 360° 3D camera vendor (e.g., "MagicCam"). MagicCam wants to sell (x) to Shoes-R-Us, while Shoes-R-Us wants sources for (x) so they may generate revenue by offering f(x) as a service (for example, Function-as-a-Service or FaaS, or serverless compute). Both Shoes-R-Us and MagicCam use the information market to advertise availability of both (x) and f(x). MagicCam places a constraint on (x) that $1000 is required in advance in order to deliver (x) reliably. An Investor (e.g., "Ike") wanting to participate in the market buys interest (i) in an f(x) margin function M(f(x)) such that the $1000 investment (i) becomes a claim on M( ) e.g., M(f(x), i). Ike places his $1000 investment into an escrow wallet that later will be distributed to MagicCam for the production of (x). When (x) is ready for consumption, Shoes-R-Us buys the future M( ); which authorizes access to (x) and legally obligates Shoes-R-Us to pay the agreed interest on (i). Shoes-R-Us generates revenue from the service built around f(x) and uses those funds to pay Ike and MagicCam. The exchange of data, Curry function, future and e-cash can be achieved using an information market.

An example data market exchange 800 may comprise a set of actors, e.g., Sellers 810, Buyers 820, Investors 850, escrow agents 840, and data market 830. The data market 830 may also be referred to by the term "information market." The data market 830 is the method and apparatus of the market framework. In an embodiment, the data market 830 is a system of message exchanges between multiple parties to achieve the objective of combining a data set to a Curry function, where the combination may be tied to an economic exchange—all within the framework of the 'data market' system. The data market exchange 800 may comprise a set of electronic wallets 881-885, corresponding to each actor 810, 820, 830, 840 and 850, for instance, for e-cash and/or blockchain transactions. It will be understood that an electronic wallet is a storage repository that may comprise data, Margin Future conditions, investment, escrow or other information, in addition to digital currency. The data market exchange 800 also includes a data source such as sensor network 870.

A Seller 810 may operate a data collection/sensing infrastructure such as an IoT network, autonomous vehicle, smart home, agricultural automation system etc. A Buyer 820 may develop data analytics methods that may be curried to a particular data set. The Buyer 820 and Seller 810 may collaborate to find interoperable data structures and techniques such that a Seller data set 871 may be curried to a Buyer's Curry function 860. An Investor 850 may convert currency from outside sources into information market e-cash, e.g., a digital currency, or other tradable digital asset. The exchange rate may be determined based on the value of the information market divided by the e-cash coin in circulation. Bitcoin is an example of an e-currency that may be used. In an embodiment, an escrow agent 840 is a holding entity that places a Curry function, data set fulfillment promise and e-cash, to create an information Future. A Future is a speculation that the items in escrow will realize a profit in a data market. The data market 830 is an institution or enterprise that produces monetized value given a data set and a Curry function. A market 830 may be a traditional brick-and-mortar market or another form of e-market.

In an embodiment, each entity in the data market exchange 800 has a virtual or electronic wallet (eWallet). As illustrated in FIG. 8, a Seller 810 has Wallet-s 881; a Buyer 820 has Wallet-b 885; an Investor 850 has Wallet-i 882; an escrow agent 840 has Wallet-ea 883; and data market 830 has wallet-dm 884. In an embodiment, Wallet-dm 884 may be used to receive profits from a data market operation (e.g., transaction). The Wallet-dm 884 may pay the Seller 810, Buyer 820 and Investor 850 stakes in a Margin Future. Wallet-ea 883 may receive investments from an Investor (Wallet-i 882) tied to an information Future. The Wallet-ea 883 may pay costs associated with the production/collection of data earmarked for a Margin Future. Wallet-i 882 may receive e-cash from external sources and from a realized Margin wallet (e.g., Wallet-dm 884) to compensate for Investor stake in a Margin Future. Wallet-b 885 may receive e-cash from realized Margin investments to compensate for Buyer stake in a Margin Future. Wallet-s 881 may receive e-cash from a Margin Future escrow wallet (e.g., Wallet-ea 883) and from realized Margin wallet (e.g., Wallet-dm 884) to compensate for Seller stake in a Margin Future. It will be understood that while embodiments herein are described as trading in digital currency, or e-cash, any tradable digital asset may be used for payment, as defined in the agreements (e.g., smart contract, or Margin Future, etc.).

In an example embodiment, as illustrated in FIG. 8, various transactions may occur and are labeled with a transaction, or activity number, within parentheses. In an illustrative transaction, a Seller 810 supplies a contract to a Buyer 820 with a guarantee to provide a data set 871 that satisfies a stored Buyer Curry function 860, at (1). The Buyer 820 creates a Margin Future $M_C(D)$ 883, at (2) (consisting of a Curry function, data set provision guarantee, data acquisition cost and Seller/Buyer stake) and places the Margin Future in escrow via an escrow agent 840, at (2). A wallet, as described herein, may be seen simply as a secure storage resource, and may store both the e-cash transaction information, as well as, information related to the transaction. In an embodiment, a "Future" is a contract, or agreement, that obligates a Buyer to provide a Curry function; a Seller to provide a data set and an Investor to provide capital. The respective parties do not have to actually produce the function, data or capital in order to create a Margin Future. They may, for example, supply a "claim" instead. In this context, a claim is a term of art and may be defined as a tuple of (claim type, right, value). The claim type distinguishes classes of claims. The right is a capability over a resource. The value refers to something over which a right is defined.

In an embodiment, an e-wallet (Wallet-ea 883) stores the Margin Future because in most cases the Investor will supply e-cash. But even so, e-cash is conceptually a "claim" that obligates two wallets to offsetting transactions (e.g., debit wallet A $100, and credit wallet B $100). In an embodiment, the curried Margin function $M_C(D)$, at (2), creates a Margin Future. An Investor 850 may create a Margin Future comprising the Margin function, Investor stake and infusion of investment (e-cash) at (3). The Wallet-i 882 may pay data acquisition costs to Wallet-s 881 to cover operational costs of harvesting the data, shown via the escrow agent Wallet-ea 883 at (4).

In an embodiment, activities at (2) and (3) result in a Margin Future. Conceptually, activity (2) may be seen as two actions, e.g., (2a) and (2b), where data D is shown coming from Seller (2a) and Mc( ) is coming from Buyer (2b). Then the Margin Future may be seen as the combination of activities (2a, 2b and 3) producing Mc(D).

In an embodiment, the Seller data source in the sensor network 870 may produce a data set 871 and supply it to a data market 830 via the Seller 810, at (5). A Buyer 820 may supply the Margin function $F=M_C(D_{P4})$) to the data market 830, where the market creates Margin and generates a return on the Margin Future. E-cash profits are supplied to the data market Wallet-dm 884, at (6). The Wallet-dm 884 may then pay the Investor stake in the Margin Future to Wallet-i 882, at (7). Wallet-dm 884 pays the Buyer stake in the Margin Future to Wallet-b 885, at (8). And Wallet-dm 884 pays Seller stake in the Margin Future to Wallet-s 881, at (9).

In an embodiment, the Curry functions 860 are functions that return another function. A function is a binding between data and some operation. Currying allows recursive application of data to function(s). Some embodiments can apply the Currying principle to e-market data such that the result of evaluation of market data is another function that produces at least one of the following outcomes:

E-cash or other digital asset;
Inference data (new information); or
E-market function (new function that accepts existing data or inference data).

In an example, the market 830 refers to a service the Buyer provides. In the example above, Shoes-R-Us created a service that produced custom fit shoes via a 3D printer. This is, conceptually, what market 830 is trying to capture. In FIG. 8, function F at flow (6), is the Shoes-R-Us service function and market 830 is the website that hosts the user experience involving function F. Market 830 generates e-cash since users are expected to pay using e-cash "script" or with a credit card, which is converted into e-cash script by market 830. Wallet-dm 884 contains the e-cash revenue that is distributed to the other stake holder wallets automatically (as defined by the claims in the Margin Future).

In an illustrative example, a Margin Future M defines how to identify potential Buyers of white cars given location (L), temperature (T) and age range (A); these are referred to as "context" functions. In the example, M is a set of claims that obligates the transfer of data 871 to Buyer 820 and instructs Wallet-dm 884 to pay Investor(s) 850 and Seller(s) 810 when market 830 conditions are met, e.g., when there is revenue. In this example, three sensor data suppliers (Sellers) each may supply a location, a temperature and an age. A Curry function F is defined that binds each data supply to the Margin function:

$F=f(A, f(T, f(L, M(D))))$; for some data set D. Function F may be used to produce e-cash when sold as a good in an e-market. (e.g., an advertiser runs F to produce advertisements that are placed with potential Buyers resulting in car purchases). M describes an expected conversion rate (number of cars that will be sold within a period of time after placement of the ads). A Future function F'=Future(F, conversion), may establish the value (in e-cash) after car sales are booked. Additional results may be netted. For example, F''=Information(F', Historical_data) where F'' produces an improved Margin estimate/correction based on analysis of historical data involving Curry function F and Margin Future F'. F'' may be used recursively in the e-market to be curried to an appropriate Margin function where the cycle repeats.

In an example, if a data producer (e.g., Seller 810) is trying to find a Buyer to partner with, in a thick market where there are many possible Buyers, the Seller may negotiate for the best deal, based on, for instance, the best commission, who has the best analytics algorithms, who has the best track record (Buyer reputation) or other criteria for risk/reward trade-off.

Buyers and Sellers may undergo several iterations of negotiation before a contract is agreed upon. In an embodiment, the data and exchange market 800 may utilize a blockchain architecture 890 for recording transactions and initiating payments and fulfillment activities. In a blockchain architecture, a smart contract may be formed and recorded in the blockchain ledgers. A "smart contract" is a term of art related to blockchain technology used to identify a trackable and enforceable agreement between parties. Also known as a cryptocontract, a smart contract may be implemented as a computer program that directly controls the transfer of digital currencies or assets between parties under certain conditions. A smart contract may define the rules and penalties around an agreement in the same way that a traditional contract does, but it may also automatically enforce those obligations by taking information input and assigning value to that input through the rules set out in the contract. Executing the actions required by those contractual clauses may result in information stored in a public ledger (or blockchain) to track performance and initiate automatic payments, or asset exchange, when conditions are met.

Other embodiments may use a central authority to record and enforce transactions. The Curry function may facilitate negotiation refinement by binding (Currying) additional terms. For example, if Seller iteratively negotiates three additional terms in response to Buyer counter negotiations, the series of negotiations may be represented as a Curry function of the form C. Conditions($f(c1_S,c1_B)$, $f'(c2_S, c2_B)$, $f''(c3_S, c3_B)$, . . . ). The condition function may be curried to the Margin function as an additional context function (nested), for instance: $F=f(C, f(A, f(T, f(L, M(D)))))$.

A Curry function can associate a particular data set with a particular algorithm (e.g., executed by a software application) and represent it as a new object. The curried object may be named, for example, in a Margin Future. The named Curry function may be executed such that the Blockchain may record precisely which data item and which functional transformation was applied to the data item.

In some systems, when a patch or update is applied to a software application, it changes the application—it is no longer the same application. The application version number is typically the way to identify the application. A software ID tag (SWID tag) may also be used to associate a unique identifier to software that is cryptographically different. In trusted computing, another technique may be used to identify the application, for instance, a method that computes a cryptographic hash of the application before and after the update. The hash results will differ and a whitelist may be used to associate the hash value with the app and version number.

Some embodiments can do away with this hash function. Instead, if an update is needed, it may be applied to the Curry function and produce a new Curry function. Thus, each application version may be identified by a different Curry function identifier. Since the update could have modified the type of data it may consume, a new contract may be negotiated that ensures the right permutation of data/function is agreed to. These changes may result in an improved user experience at the market (830) resulting in a better return on investment. In an embodiment, an Investor 850 may modify the stake in a Margin Future based on changes in the Curry functions used.

In an embodiment, if the update prematurely ended the expected return on investment of the previous generation Margin Future, the loss may be rolled into the subsequent Margin Future. In an example, the Investor 850 may just decide to take the loss and stop investing at that point. In an embodiment any stakeholder may ask to re-negotiate a contract, resulting in a new Margin Future. The new Margin Future may be unchanged from the previous one (except for esoteric tracking) or it may be different based on updated return-on-investment (ROI) parameters.

Figure 9:
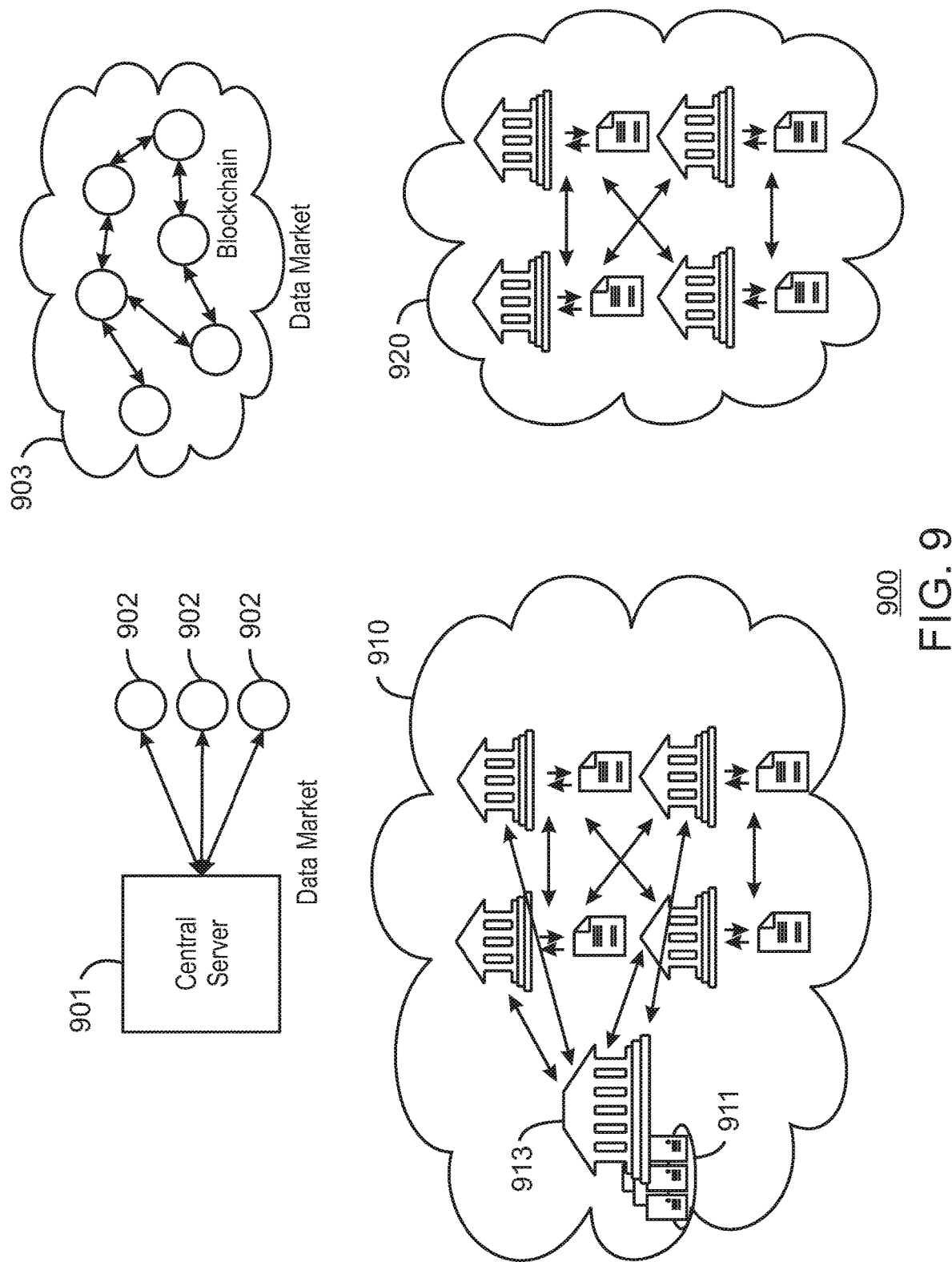
FIG. 9 illustrates a method for implementing an online data market and exchange in accordance with some embodiments.

In an embodiment, transactions in the data market exchange 800 may be committed and enforced using a blockchain 890 with various blockchain technology implementations. FIG. 9 illustrates alternative architectures for implementing a data market, according to embodiments. In an example, a data market may be hosted as a distributed system 903 on a central server 901. The data market actors may perform e-market transactions involving a central server (client-server) 901 or may involve use of a distributed blockchain approach 903, where contracts, transactions and other information is distributed and stored among the nodes 902 in the network (for example, among the compute nodes 902 in the network). In an example, a central server 901 processes transactions and may rely on a central transaction log for consistency. However, this approach may result in a single point of failure. Using a distributed blockchain approach 903 removes the central point of failure risk. A blockchain architecture may still have a centralized trust model, however.

The data market, though distributed, may depend on central trust (e.g., key management) architecture 910 utilizing a central authority 913 with a central server 911, or may use a distributed trust mechanism 920 such as blockchain proof-of-work, proof-of-waiting or proof-of-stake algorithm. Proof-of-work algorithms may ensure that it is equally difficult to cheat as they involve solving NP-hard problems, e.g., non-deterministic polynomial-time hardness. Distributed trust (or diffuse trust) means all nodes (for example, all compute nodes) must establish consensus trust whenever a trust decision is required. For example, if the data market actors (e.g., elements 810, 820, 830, 840, 850 from FIG. 8) process transactions involving a newly minted wallet key, a consensus of nodes in the Blockchain 920 (for example, a consensus of compute nodes in the blockchain 920) must agree the new key is trusted.

This trust may be achieved, for example, by having each node attest to the trusted execution environment (TEE)/wallet technology that maintains the key and then circulating the attestation result to verify each obtain the same attestation result.

Each trust node may implement a proof-of-custody and provenance record that may be useful for detecting suspicious and malicious interactions among market participants. One advantage to using blockchain to host the market is that each participant ensures collusion among the various participants, requiring a threshold (e.g., >50%) before market manipulations may occur. In other embodiments, hosting the data market on a centralized cloud server 911 may have certain performance benefits.

For instance, it may be possible to construct a blockchain that distributes transactions according to some fault-tolerant byzantine agreement protocol but does not distribute the security component. For example, a central entity 913 may hold a master key that is used to obtain all other keys used in the system. This is commonly the approach existing financial institutions have applied blockchain technology. Some financial institutions claim such an approach provides higher transaction throughput and offers better user experience, because a user who accidently lost all their funds when their wallet was lost could make a compensating transaction. Since an e-market can be constructed to anticipate compensating transactions, a percentage of e-cash can be dedicated to that purpose. In this manner, scenarios resulting in the loss of e-wallets due to a computer glitch can be more forgiving, without manipulating currency.

Embodiments may use a distributed approach as in 920 such as an approach that may also distribute the security and trust. In this case, there is no central trusted authority. But typically the added overhead of distributed trust means transaction throughput goes down. Some refer to this distributed security and trust as "diffuse trust."

Figure 10:
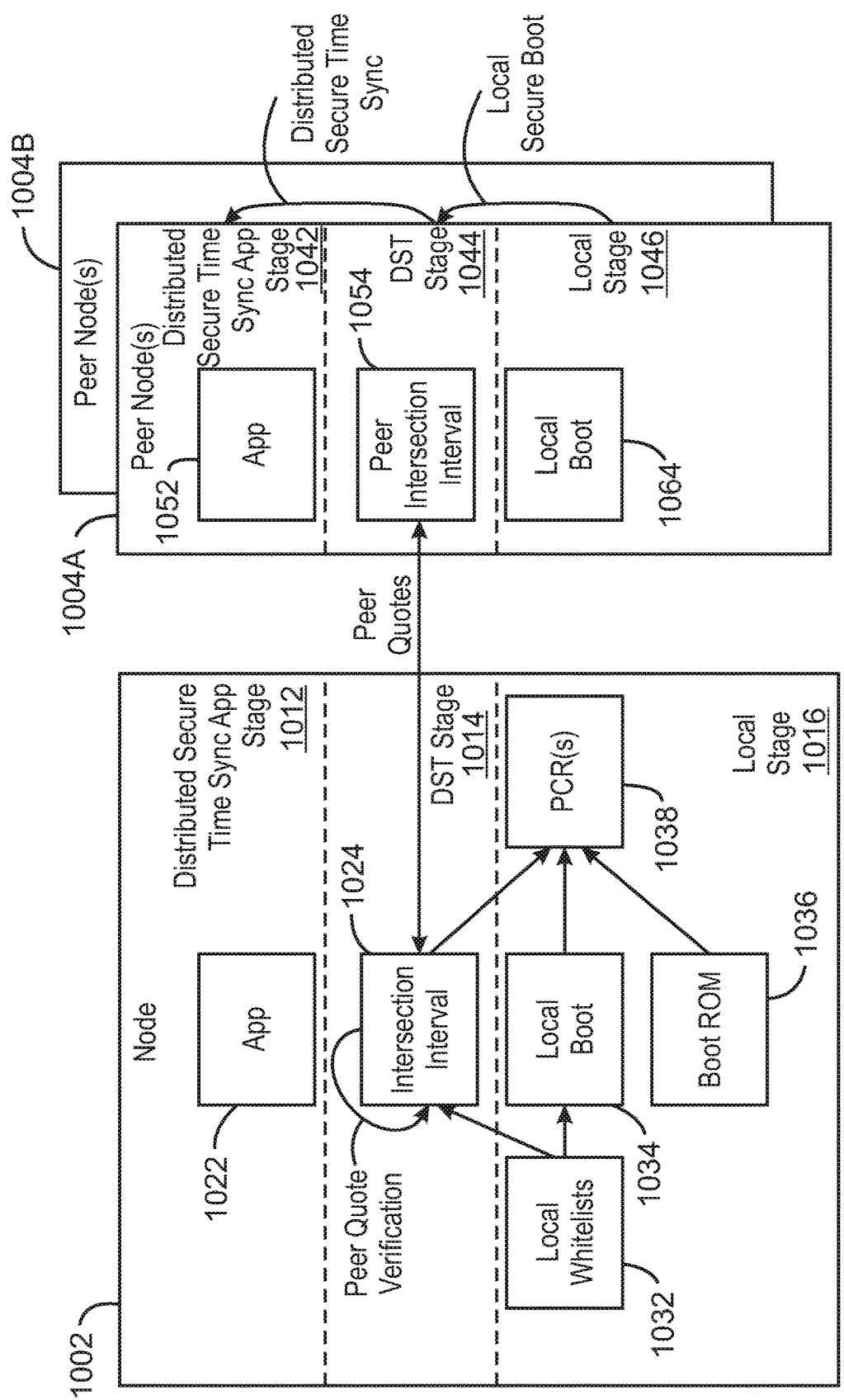
FIG. 10 illustrates a system in accordance with some embodiments.

FIG. 10 illustrates a system 1000 (and/or an architecture 1000) in accordance with some embodiments. System 1000 can include node 1002 and one or more peer nodes 1004A, 1004B, . . . , etc. In some embodiments, some or all nodes in system 1000 can be compute nodes. While two peer nodes 1004A and 10048 are illustrated in FIG. 10 it is noted that any number of peer nodes can be included in some embodiments. System 1000 as illustrated in FIG. 10 can be a trusted execution environment (TEE) between the nodes 1002, 1004A, 1004B, etc.

Node 1002 includes a distributed secure time (DST) synchronization application stage 1012, a distributed secure time (DST) stage 1014, and a local stage 1016. Distributed secure time (DST) sync app stage 1012 includes an application 1022. DST stage 1014 includes an intersection interval 1024. Local stage 1016 includes local whitelists 1032, local boot 1034, boot ROM 1036, and Platform Configuration Register(s) or PCR(s) 1038. In some embodiments, local whitelists 1032, local boot 1034, boot ROM 1036, and PCR(s) 1038 can be implemented according to trusted computing technologies (for example, such as the Trusted Computing Group or TCG trusted platform module or TPM), and can be implemented as part of a TPM. The distributed secure time sycn (DST) app stage 1042 can include an application 1052. The DST stage 1044 can include a peer intersection interval 1054. The local stage 1046 can include a local boot 1064. Although not illustrated in FIG. 10, other peer nodes such as peer node 1004B, etc. can include similar elements as peer node 1004A. In some embodiments, intersection interval 1024 and peer intersection interval 1054 can be used to exchange peer quotes (for example, peer distributed sycnchronization time quotes), and intersection interval 1024 can verify peer quotes from the peer nodes 1004A, 1004B, etc. Intersection interval 1024 can send quotes to peer nodes 1004A, 1004B, etc., and can also verify quotes sent to node 1002 from the other nodes.

In some embodiments, local whitelists 1032, local boot 1034, boot ROM 1036, and PCR(s) 1038 can be implemented as part of a trusted execution environment (TEE). In some embodiments, nodes 1002, 1004A, 1004B, etc. can be implemented according to trusted computing technologies. In some embodiments, nodes 1002, 1004A, 1004B, etc. can include a protected or secure boot and the ability to attest to what software, firmware, and/or hardware are running to another node such as a peer node, for example. In some embodiments, each of the nodes 1002, 1004A, 1004B, etc. can attest that they have a trusted execution environment (TEE) technology that is appropriate for implementing trusted operations (for example, a trusted delete or other trusted operations).

In some embodiments, the blockchain enforces sequencing of the blocks, and possible cases for time include a situation where each computer (and/or node, and/or compute node) includes its own time, and a situation where a part of getting the right answer for the block hash includes the time being included in the hash (in which case all nodes need to agree on the time in order to commit the block). In a situation where the time is not part of a block, according to some embodiments sequencing is available in order to see the time for each of the different miner computing nodes based on sequencing of the block. In this manner, an approximate relative time may be obtained. In some embodiments, time is included in the block in a manner that provides even more security. In some embodiments, each node may be required to modify its clock in order to obtain the correct block answer including the time portion of the block. That is, each node may need to adjust clock skew in order to get the right block hash. In some embodiments, each node may have a good reliable source (for example, an atomic clock) in order to provide an accurate time.

In some embodiments, the nodes in FIG. 10 can be used to implement secure tamper resistant time management across multiple data players (for example, in an information exchange) to track usage and information degradation over time. Data (for example, e-asset) time cycle management in such an information exchange can be tracked according to some embodiments using a blockchain technology where each data exchange/trade is captured as a transaction processing in blockchain, hardened using trusted execution technology such as Intel SGX, TXT, VT, CSME, PTT, etc. Blockchain technology can provide secure time stamp synchronization between heterogeneous data players. A distributed consensus based secure time stamp synchronization and enforcement can be implemented across all participants throughout the data cycle. As a result, distributed ledger transactions can become tamper resistant audit trails for regulatory bodies.

In some embodiments, two party secure time management can be scaled to multi-sided data platforms where content/data can change hands multiple times with value enhancements along the way. Hardened implementations of secure time stamp management may be implemented using TEE with heterogeneity. In accordance with some embodiments, blockchain based decentralized distributed ledger can help minimize transaction cost and improve auditability of secure time transactions associated with the data, which can be of especially significant value in a multi-sided information exchange.

In some embodiments, system 1000 uses trusted computing nodes to do attestation. Based on attestation, a strength of function of trusted execution environment (TEE) technology used in the various nodes can help provide information relating to the trustworthiness of the time function of each node. This can be used as a weighting factor. For example, if a first node is using an atomic clock with nine digits of precision, and a second node is using a clock using a quartz crystal, the clock of the first node can be weighted more heavily. This clock trustworthiness weighting can be used as a factor to select the time. In this manner, in some embodiments, the node with the more accurate clock may win a block commit.

In some embodiments, with an addition of a time condition being included in the blockchain block, a node can agree with a time of another node and adjust its clock, or can disregard the block since it does not agree with the time of the other node (for example, within a certain time tolerance value). In this situation, the node can disagree and commit its block with its time included, and wait for consensus from other blocks (and/or from other nodes). In some embodiments, a node might even ignore its default policy and use another clock value if it is identified as a more reliable clock and confirmed as being trustworthy and not malicious. In some embodiments, if a node is identified as a time outlier (for example, it's time is often off and/or off by a large amount, and/or seen as malicious), that time outlier node can be blacklisted as untrustworthy. It is noted that as a result of using blockchain technology, such an outlier node may always be on a blockchain branch. In some embodiments, a node adjusting its clock can become a transaction on the blockchain.

In some embodiments, a blockchain is used to agree on a current time. An intersection process can be used among each blockchain node (for example, among each node 1002, 1004A, 1004B, etc.), where each blockchain node includes in its transaction block an estimation of the current time. As part of the computation of the block hash, the node computes the intersection of a number of intervals. Each node contributes its interval to each of the other blockchain nodes. If the intervals are the same (or within an acceptable time tolerance), then the block hash matches the hash of the other nodes. If it differs (or is not within an acceptable time tolerance), the hash will not match. If it does not match, the node can modify the time interval according to an intersection process involving intervals received from the current blockchain block. The new block is presented to the blockchain for committal to the blockchain. If the hash matches, then the block is committed. In some embodiments, since the blockchain proof-of-work requires a majority of nodes to agree on the block hash, nodes that incorrectly computed the intersection will result in forked blockchains until a majority agree. Forked blocks in the minority are discarded in favor of the majority blockchain which contains the updated time intervals. These updated intervals are used as the starting point for the next block time interval intersection calculation.

In some embodiments, since the blockchain blocks contain transaction data, the time of transaction is timestamped using included time intervals from other blockchain nodes. In some embodiments, since the blockchain process does not accept a block hash that a majority of nodes disagree with, only correct time intervals will be included in the winning blocks.

In some embodiments, trusted execution environment (TEE) modules may enforce data degradation policies using blocks containing time-based degradation. For example, data labeled with a validity period may use the time intervals of the first block containing the degradable content to initialize a timer and timer intervals from a current or most recent block containing the same content in order to compare an elapsed time from the current time (for example, obtained from the most recently received block). When the elapsed time equals the validity period, the TEE may perform a trusted delete of the block. In some embodiments, the TEE relies on a blockchain time to calculate the interval when it is appropriate to delete. In some embodiments, it may be appropriate to include the block hash result of the deleted block in the delete transaction to maintain the hash chain consistency. The contents that produced the hash can nevertheless be deleted. A pointer to the block containing the delete transaction may be supplied in place of the now deleted block. This may not be a guarantee of absolute deletion as it is possible copies of the blockchain may exist outside of the blockchain mining nodes. In some embodiments, the deletion transaction may be written to the current blockchain block, and all blockchain nodes then agree that the content has been deleted. If a TEE discovers that the content exists subsequent to receipt of the trusted delete block, the TEE then removes that content from memory (for example, from local memory of the node).

In some embodiments, it may be appropriate for subsequent deletes to contribute a "delete" transaction to the blockchain so that the blockchain can track the deletions. In some embodiments, each deletion event can be implemented as a decrement to a reference count of the number of copies of the data that were made. In some embodiments, data transactions resulting in the copy of duplication of the data content can be contributed to the blockchain. The TEE can observe the occurrence of new content to be a data "birth" event where a birth transaction is committed to the blockchain, including the time of the birth event. Each birth event can be considered to be an increment to the reference count of the data content.

In some embodiments, if the same data content is replicated (for example, as a part of an information exchange transaction), the instantiation of the data item can result in a reference count increment, and deletion of the content can result in a reference count decrement. All data content known to the blockchain can thus be reference counted. Using a policy for content expiration and distributed time agreement, content removed from all nodes can be known and tracked. According to some embodiments, a maximum count of occurrences of the content can be known and tracked such that a popularity of particular content can be tracked and indexed to time.

Figure 11:
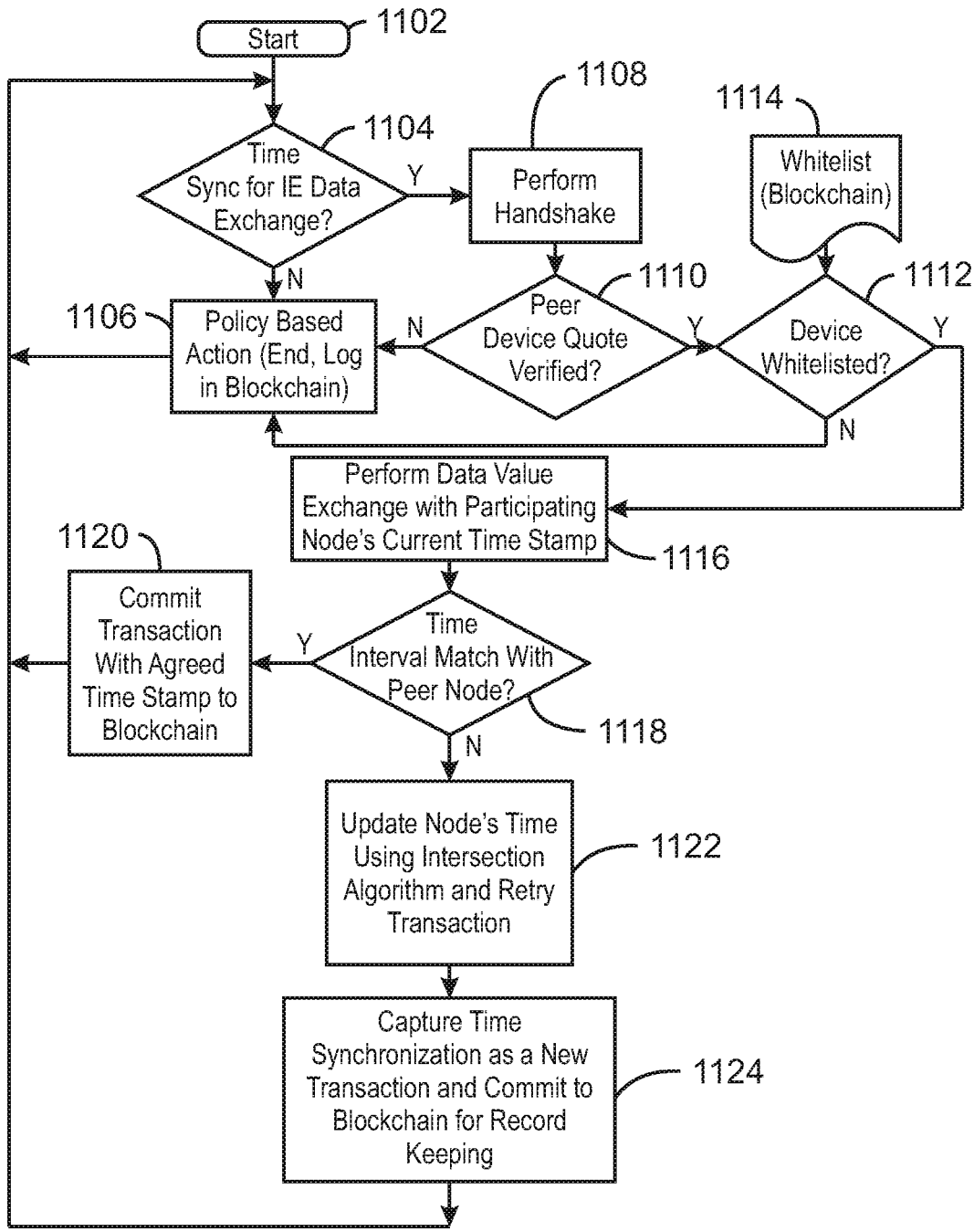
FIG. 11 illustrates time management using blockchain in accordance with some embodiments.

FIG. 11 illustrates a time synchronization flow 1100 in accordance with some embodiments. In some embodiments, flow 1100 represents time management using blockchain in accordance with some embodiments. In some embodiments, flow 1100 can be implemented by any one or more nodes, compute nodes, and/or IoT devices illustrated and/or described herein. For example, in some embodiments, flow 1100 can be implemented by node 1002, by node 1004A, and/or by node 1004B, etc.

Flow 1100 starts at 1102. At 1104, a determination is made as to whether time synchronization for information exchange (IE) data exchange has been activated (for example, for any data of interest available in an IE). If time synchronization is not activated at 1104, a policy based action (for example, End, Log in Blockchain) is implemented at 1106, and flow returns to 1104. That is, the system identifies at that particular point in time that time synchronization was not required or activated, for example. In this situation, the flow allows the transaction to be approved without going through a blockchain based consensus protocol, logs to keep a record of what is going on, and moves forward to wait for the next transaction at 1104. Flow continues to log and book what is going on until time synchronization is activated and identified at 1104. If it is determined at 1104 that time synchronization is activated (or is enabled), a handshake is performed at 1108. The handshake at 1108 can be implemented, for example, using nodes of system 1000 as described in reference to FIG. 10. In some embodiments, a handshake may be performed at 1108 between two or more nodes such as, for example, nodes 1002, 1004A, 1004B, . . . , etc. of FIG. 10. In some embodiments, a number of nodes can broadcast intersection intervals of their time states, and the other nodes can identify whether the time state of a particular node is in synchronization by being within a tolerable time interval, for example. Once the times of all the nodes synchronize, after the initial handshake happens at 1108, a determination is made as to whether the time code sent by a particular node is verified. If all nodes are determined to be time synchronized, That is, at 1110 a determination is made as to whether a peer device quote is verified. If not, the devices are not time synchronized (for example, less than a majority of the nodes such as less than 50%, 50% or less, or 51% or less of the nodes, for example, are in time agreement and/or are in time agreement within a particular tolerance) and flow returns to 1106. In this situation, the nodes are out of synchronization, and in some embodiments, synchronization verification is no longer enabled, for example.

If the devices are verified at 1110, flow moves to 1112 to determine whether the device is whitelisted or blacklisted. For example, the devices are verified (for example, based on manufacturing provision credentials), but 1112 checks to make sure the device is whitelisted and not blacklisted (for example, compromised so that it is not on the whitelist). The whitelist (blockchain) 1114 is a list of nodes (or a list of devices or appliances) allowed to be used. For example, if an outlier device (or outlier appliance, or node such as a compute node) is constantly out of sync with a time that is not consistent with other devices, that device may have been tampered with, and/or may have received malicious software. In some embodiments, those nodes can be blacklisted as nodes that are compromised and no longer trustworthy. They are then removed from and not included on this whitelist of nodes, and the blacklisted nodes are not able to bother the remaining nodes that are on the whitelist. In some embodiments, certain devices (or groups of devices) can be approved (whitelisted) or can be unapproved (blacklisted) for participating in certain transactions. In some embodiments, whitelist 1114 can be stored as part of the blockchain. In some embodiments, if one or more whitelisted node sees that a blacklisted node wants to add to the blockchain, the whitelisted node (or nodes) will ignore the transaction requested by the blacklisted node. In this situation, flow can move to 1106 to cancel any transaction and log events, for example.

If it is determined at 1112 that the device is whitelisted, flow moves to 1116 to perform a data value exchange with the participating node's current time stamp. That is, a time synchronization can also occur at this point if there is a slight time mis-match between whitelisted nodes if the time mismatch is within an acceptable tolerance. When blacklisted nodes have been eliminated, a transaction can be committed to the blockchain. At 1118, a determination is made as to whether a time interval match with a peer node has occurred. In some embodiments, this time interval match can be within a tolerance value (for example, within a tolerance of 5 milliseconds in some embodiments or a minute in some embodiments). In some embodiments, this time interval match can be within very quick tolerance (for example, within a nanosecond). The tolerance value can be different in various implementations. If the time interval does match at 1118 (or is within a particular time tolerance value), the transaction can be committed to the blockchain at 1120 with an agreed time stamp, and flow can return to 1104 to wait for the next transaction. If not, the node's time can be updated at 1122 using an intersection algorithm (for example, a tolerance algorithm) and the transaction can be re-tried. At 1124, the flow captures time synchronization as a new transaction and commits to the blockchain for record keeping. Flow then returns to 1104 to wait for the next transaction.

In some embodiments, clock synchronization for all whitelisted nodes can be implemented for each transaction (for example, during each transaction). The clock can be reset based on the new synchronized time. In this manner, in some embodiments, a clear audit trail can be permanently provided based on, for example, the time synchronizations, geographic locations of the nodes, etc. It can thus be determined if clock skew was slightly adjusted based on communication latency, for example, or if clocks were not processing correctly or calibrated properly, etc.

Figure 12:
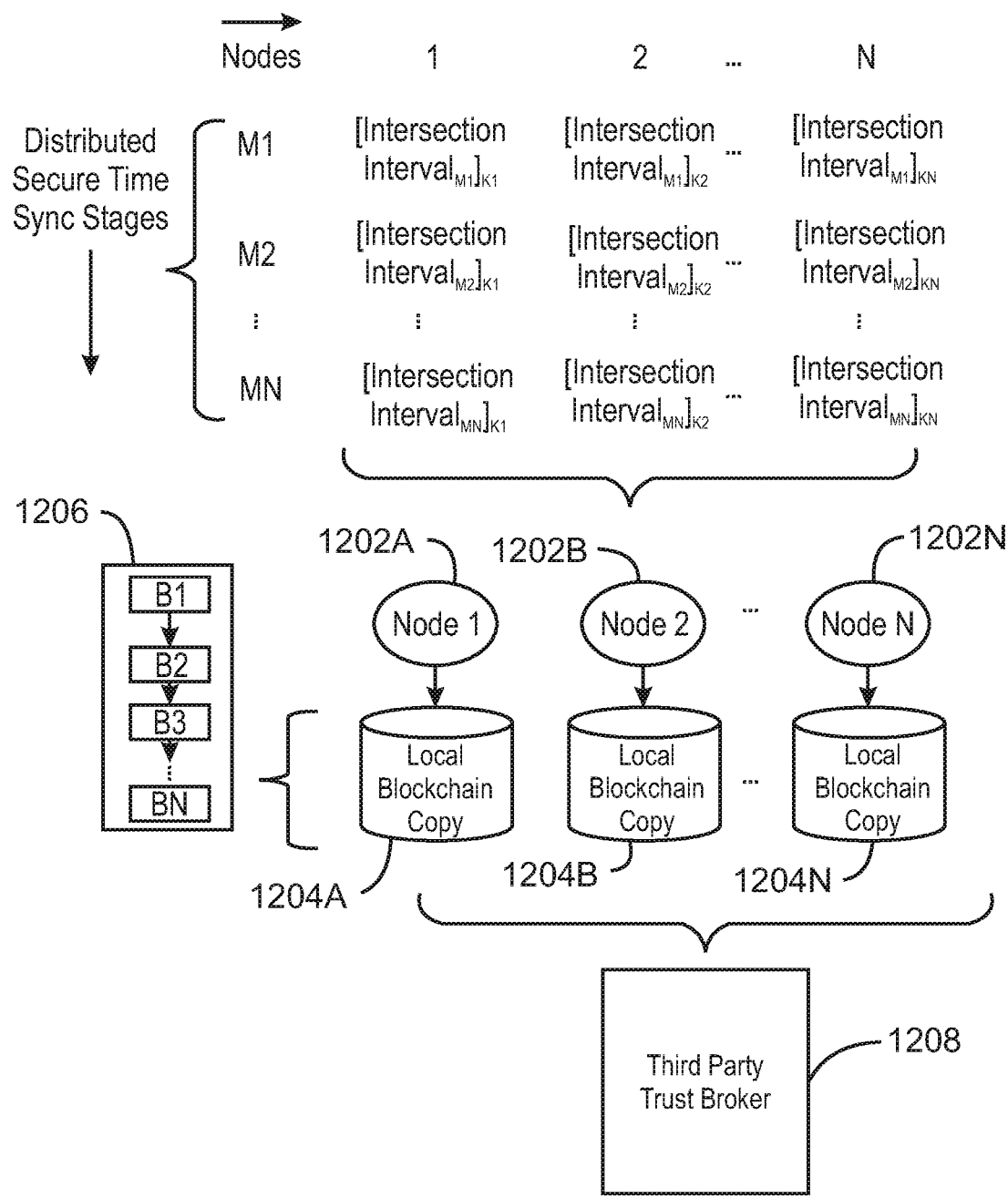
FIG. 12 illustrates blockchain with time intersection interval in accordance with some embodiments.

FIG. 12 illustrates a system 1200 in accordance with some embodiments. In some embodiments, system 1200 can be used to implement blockchain operations with a time intersection interval operation. FIG. 12 illustrates a number of nodes 1, 2, . . . , N (1202A, 1202B, . . . , 1202N) and a number of distributed secure time (DST) sync stages M1, M2, . . . , MN. In some embodiments, the nodes 1, 2, . . . , N (1202A, 1202B, . . . , 1202N) may be compute nodes, may be appliances or devices, or may each be a group of appliances and/or devices working together). It is noted that the number of nodes (N) and the number of time sync stages (N) are illustrated as being the same (N) in FIG. 12, but any number of nodes and any number of time stages can be implemented in some embodiments. FIG. 12 also illustrates the local blockchain copy for each of the nodes (1204A, 1204B, . . . , 1204N). A representative blockchain 1206 is also illustrated in FIG. 12 using B1, B2, B3, . . . , BN, for example. In some embodiments, a third party trust broker 1208 can be used to further ensure trust in the blockchain operation, including use of time in the blockchain.

FIG. 12 illustrates intersection interval values [Intersection Interval$_{M1}$]$_{k1}$, [Intersection Interval$_{M1}$]$_{k2}$, . . . , [Intersection Interval$_{M1}$]$_{kN}$, [Intersection Interval$_{M2}$]$_{k1}$, [Intersection Interval$_{M2}$]$_{k2}$, . . . , [Intersection Interval$_{M2}$]$_{kN}$, . . . , [Intersection Interval$_{MN}$]$_{k1}$, [Intersection Interval$_{MN}$]$_{k2}$, . . . , [Intersection Interval$_{MN}$]$_{kN}$, for example. The intersection interval values can be used for an intersection interval operation process in accordance with some embodiments. For example, in some embodiments, each block (Bx) illustrated in FIG. 12 can be calculated according to Equation 1:

$$\sum_{i=o}^{N} [\text{Intersection Interval}_{Mx}] K_i \quad \text{Equation 1}$$

where Ki is a cryptographic signing key that authenticates the intersection interval for each sync stage. For example, 60 sync stages may be distributed evenly over an hour to ensure clocks don't get more than 2 minutes out of sync (as a worst case scenario). These keys are specific to each node (or device, or miner, etc.)

For example, in some embodiments, each block (Bx) illustrated in FIG. 12 can be calculated according to Equation 2:

$$[\text{Intersection Interval}_{Mx}] K_i \quad \text{Equation 2:}$$

In some embodiments, the intersection interval can be for a sub-set of all files.

FIG. 12 represents the interval across the nodes, which could be slightly different in some embodiments. In some embodiments, the different intervals for different nodes can get tweaked slightly, and the blockchain can be appropriately synchronized. The intersection interval can capture any clock skew differences between nodes.

In some embodiments, an intersection process can be implemented (for example, in reference to FIG. 12). In some embodiments, given M intervals, an interval with M−f sources can be identified, where f is a value referred to as a number of false tickers. Given M intervals of the form of c±r (which can mean [c−r,c+r]), some embodiments can find an interval with M−f sources. The value f can be a number of false tickers, meaning those sources with are in error (for example, for which the actual value is outside a confidence band). In some embodiments, a best estimate can be one that assumes the least number of false tickers f. In some embodiments, results can be considered valid if f<M/2, for example. If results are not considered valid, then a failure condition can be returned rather than an interval.

In some embodiments, the intersection process begins by creating a table of tuples <offset,type>. IN some embodiments, for each interval, there are three entries, including a lower endpoint, a midpoint, and an upper endpoint (for example, labelled with types −1, 0, and +1, respectively. The interval c±r can then result in entries <c−r,−1>, <c,0>, and <c+r,+1>. These entries can then be sorted by offset.

In some embodiments, the flow of the intersection process can use the following flow, where the process uses f as number of false tickers, endcount and midcount are integers, and lower and upper are values of offsets. This flow of the intersection process can help describe how to adjust a clock of a node (for example, how to adjust a clock of a compute node) in accordance with some embodiments.

1. [initialize best f] Start with f=0, assuming all input intervals are valid. Each time no interval is found, f will be incremented until either an interval is found or f≥M/2.

2. [initialize] endcount=0 and midcount=0.

3. [find lower endpoint] Start at beginning of the list [lowest offset] and consider each tuple in order. Endcount=endcount−type. If endcount≥M−f, then lower=offset and goto step 4 because the possible lower endpoint has been found. If the type=0 then midcount=midcount+1. Repeat with next tuple. If end of list is reached, then goto step 6.

4. [tentative lower endpoint found, initialize to find upper endpoint] set endcount=0.

5. [determine number of midpoints] Start from end of list and work towards lower offsets. endcount=endcount+type. If endcount≥M−f, then upper=offset, goto step 6. If type=0 then midcount=midcount+1. Repeat for next tuple. If reach end of list then goto step 6.

6. if lower≤upper and midcount≤f, then return interval [lowerendpoint,upperendpoint] as resulting confidence interval.

7. [increment number of falsetickers] f=f+1. If f≥M/2, then terminate and return FAILED, otherwise goto step 1.

In some embodiments, a majority (M−f)>M/f of nodes agree to the current time. A variety of particular secure time algorithms may be implemented according to some embodiments. In addition, in some embodiments, control of a wall clock time being trustworthy and authorized may not be necessary. Time can be determined based on whether a majority of nodes agree to the time (in some embodiments, within a defined tolerance). If the majority of nodes (for example the value of M−f) can agree to the time, then the intersection process may work and the majority agreed upon time may be used. In some embodiments, adjustments such as those for daylight savings time can be made (for example, according to country specific regulations) without requiring a globally central or trusted authority. In some embodiments, nodes use a common time (for example, Greenwich Mean Time or GMT) to synchronize time. In some embodiments, some nodes (for example, nodes using an atomic clock) can be weighted more heavily than nodes with less accurate times (for example, nodes using a crystal quartz clock).

In some embodiments, even if a majority of nodes agree to reverse time, transactions occurring on a same wall-clock date can be disambiguated by their order in the blockchain, and the data valuation can remain consistent.

Figure 13:
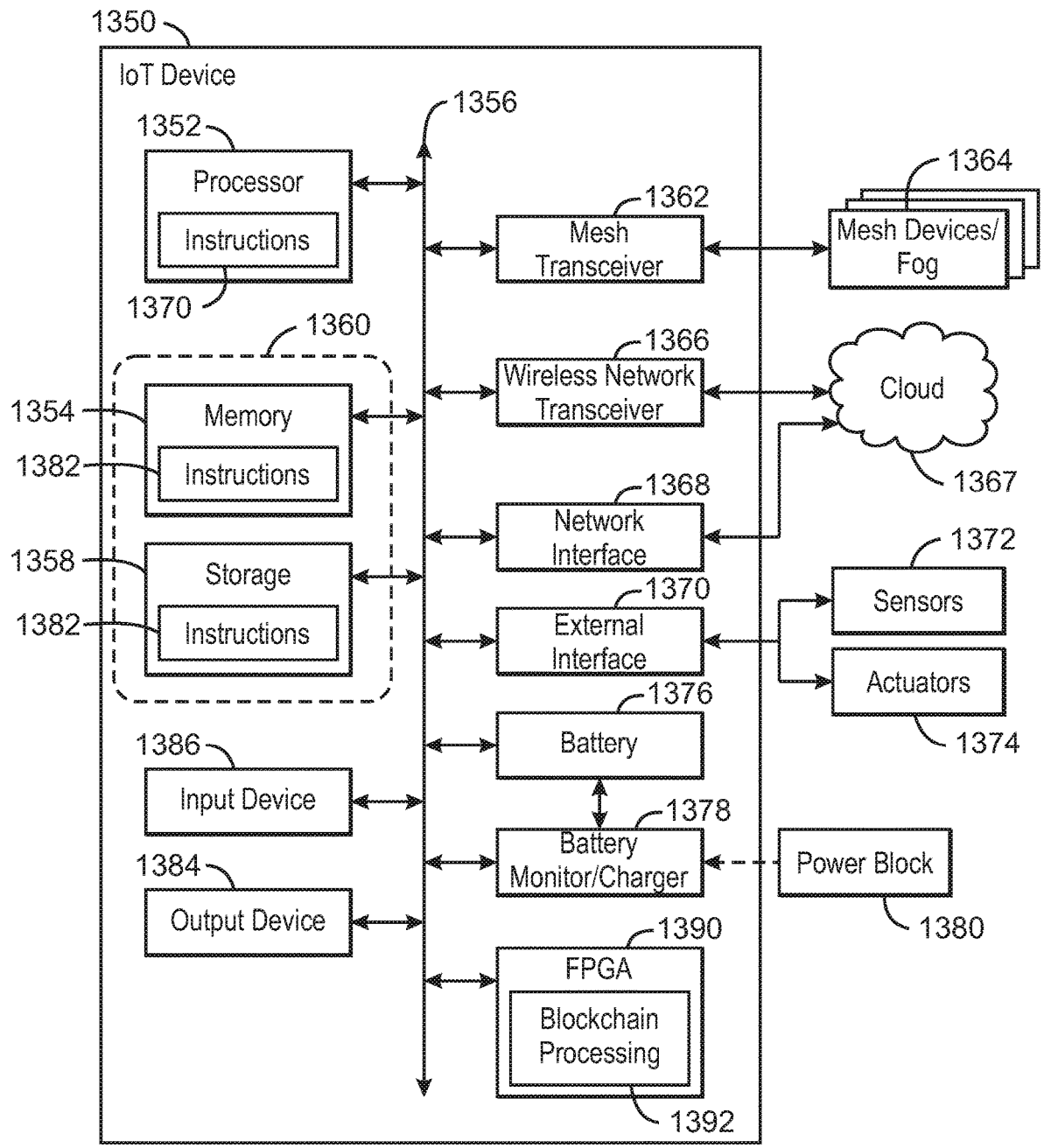
FIG. 13 illustrates a block diagram for an example IoT device (and/or IoT system architecture) upon which any one or more of the techniques (e.g., operations, processes, methods, and methodologies) discussed herein may be performed, in accordance with some embodiments.

FIG. 1 is a block diagram 1300 of an example of components that may be present in an IoT device 150 (for example, an IoT processing device) for implementing the techniques described herein. In some embodiments, FIG. 13 illustrates a block diagram 1300 for an example IoT device 1350 (and/or IoT system architecture 1350) upon which any one or more of the techniques (e.g., operations, processes, methods, and methodologies) discussed herein may be performed, in accordance with some embodiments. For example, in some embodiments, some or all of IoT device 1350 may be included in any of the nodes described and/or illustrated herein, and/or may be any of the nodes described and/or illustrated herein. In some embodiments, IoT device 1350 may be a compute node, and/or may be included in a compute node. In some embodiments, a group of IoT devices 1350 may be grouped together to form any of the nodes described and/or illustrated herein, and/or may be combined with other devices or appliances to work together to implement any of the nodes or techniques described and/or illustrated herein.

The IoT device 150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 150, or as components otherwise incorporated within a chassis of a larger system. Additionally, the block diagram of FIG. 1 is intended to depict a high-level view of components of the IoT device 150. However, some of the components shown may be omitted, additional components may be present, and different arrangement of the components shown may occur in other implementations.

The IoT device 150 may include one or more processor 152, which may be a microprocessor, a multi-core processor, a multithreaded processor, an ultra-low voltage processor, an embedded processor, or other known processing element. The processor 152 may be a part of a system on a chip (SoC) in which the processor 152 and other components are formed into a single integrated circuit, or a single package, such as the Edison™ or Galileo™ SoC boards from Intel. As an example, the processor 152 may include an Intel® Architecture Core™ based processor, such as a Quark™, an Atom™, an i3, an i5, an i7, or an MCU-class processor, or another such processor available from Intel® Corporation, Santa Clara, California. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 152 may communicate with a system memory 154 over an interconnect 156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 158 may also couple to the processor 152 via the interconnect 156. In an example the storage 158 may be implemented via a solid state disk drive (SSDD). Other devices that may be used for the storage 158 include flash memory cards, such as SD cards, microSD cards, xD picture cards, and the like, and USB flash drives. In low power implementations, the storage 158 may be on-die memory or registers associated with the processor 152. However, in some examples, the storage 158 may be implemented using a hard disk driver or a micro hard disk drive (HDD). Further, any number of new technologies may be used for the storage 158 in addition to, or instead of, the technologies described, such as resistance change memories, phase change memories, holographic memories, or chemical memories, among others.

The components may communicate over the interconnect 156. The interconnect 156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 156 may be a proprietary bus, for example, used in an SoC based system. Other bus systems may be included, such as an I2C interface, an SPI interface, point to point interfaces, and a power bus, among others.

The interconnect 156 may couple the processor 152 to a mesh transceiver 162, for communications with other mesh devices 164. The mesh transceiver 162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 164. For example, a WLAN unit may be used to implement WiFi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 162 may communicate using multiple standards or radios for communications at different range. For example, the IoT device 150 may communicate with close devices, e.g., within about 10 meters, using a local transceiver based on BLE, or another low power radio, to save power. More distant mesh devices 164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 166 may be included to communicate with devices or services in the cloud 167 (or the Internet 1367 or some other network 1367, for example) via local or wide area network protocols. The wireless network transceiver 166 may be a LPWA transceiver that follows the IEEE 802.15.4, or IEEE 802.15.4g standards, among others. The IoT device 150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 162 and wireless network transceiver 166, as described herein. For example, the radio transceivers 162 and 166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 162 and 166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 168 may be included to provide a wired communication to the cloud 167 (or the Internet 1367 or some other network 1367, for example) or to other devices, such as the mesh devices 164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 168 may be included to allow connect to a second network, for example, a NIC 168 providing communications to the cloud over Ethernet, and a second NIC 168 providing communications to other devices over another type of network.

The interconnect 156 may couple the processor 152 to an external interface 170 that is used to connect external devices or subsystems. The external devices may include sensors 172, such as accelerometers, level sensors, flow sensors, optical light sensors, camera sensors, temperature sensors, a global positioning system (GPS) sensors, pressure sensors, barometric pressure sensors, and the like. The external interface 170 further may be used to connect the IoT device 150 to actuators 174, such as power switches, valve actuators, an audible sound generator, a visual warning device, and the like.

In some optional examples, various input/output (I/O) devices may be present within, or connected to, the IoT device 150. For example, a display or other output device 184 may be included to show information, such as sensor readings or actuator position. An input device 186, such as a touch screen or keypad may be included to accept input. An output device 184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 150.

A battery 176 may power the IoT device 150, although in examples in which the IoT device 150 is mounted in a fixed location, it may have a power supply coupled to an electrical grid. The battery 176 may be a lithium ion battery, or a metal-air battery, such as a zinc-air battery, an aluminum-air battery, a lithium-air battery, and the like.

A battery monitor/charger 178 may be included in the IoT device 150 to track the state of charge (SoCh) of the battery 176. The battery monitor/charger 178 may be used to monitor other parameters of the battery 176 to provide failure predictions, such as the state of health (SoH) and the state of function (SoF) of the battery 176. The battery monitor/charger 178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 178 may communicate the information on the battery 176 to the processor 152 over the interconnect 156. The battery monitor/charger 178 may also include an analog-to-digital (ADC) convertor that allows the processor 152 to directly monitor the voltage of the battery 176 or the current flow from the battery 176. The battery parameters may be used to determine actions that the IoT device 150 may perform, such as transmission frequency, mesh network operation, sensing frequency, and the like.

A power block 180, or other power supply coupled to a grid, may be coupled with the battery monitor/charger 178 to charge the battery 176. In some examples, the power block 180 may be replaced with a wireless power receiver to obtain the power wirelessly, for example, through a loop antenna in the IoT device 150. A wireless battery charging circuit, such as an LTC4020 chip from Linear Technologies of Milpitas, California, among others, may be included in the battery monitor/charger 178. The specific charging circuits chosen depend on the size of the battery 176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 158 may include instructions 182 in the form of software, firmware, or hardware commands to implement the techniques described herein. Although such instructions 182 are shown as code blocks included in the memory 154 and the storage 158, it may be understood that any of the code blocks may be replaced with hardwired circuits, for example, built into an application specific integrated circuit (ASIC).

In an example, the instructions 182 provided via the memory 154, the storage 158, or the processor 152 may be embodied as a non-transitory, machine readable medium 160 including code to direct the processor 152 to perform electronic operations in the IoT device 150. The processor 152 may access the non-transitory, machine readable medium 160 over the interconnect 156. For instance, the non-transitory, machine readable medium 160 may be embodied by devices described for the storage 158 of FIG. 1 or may include specific storage units such as optical disks, flash drives, or any number of other hardware devices. The non-transitory, machine readable medium 160 may include instructions to direct the processor 152 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

In an embodiment, network interface device 168 may include instructions to implement Blockchain functionality as embedded instructions. Similarly, it should be understood that instructions to implement the Blockchain functionality may be implemented as instructions 182 in machine readable storage medium 158, in a secure or isolated storage area. For instance, instructions 182 may be encrypted when outside of a TEE or secure embedded controller such as network interface 168. In an embodiment, a field programmable gate array (FGPA) 190 may be programmed to implement blockchain functionality 192, or other subsystem implementing a portion of the functionality described herein. In an embodiment, the FPGA 190 may be connected through a subsidiary bus to memory 160, or any of the network controllers 162, 166, 168, or both. In an example, the FPGA 190 may have direct memory access to communications buffers.

Many nodes and compute nodes have been described and/or illustrated herein. In some embodiments, any of these nodes can be composed of several devices and/or appliances working together (for example, several IoT devices and/or IoT appliances working together). For example, a gateway such as an IoT gateway may include one or more of the nodes, appliances, devices, etc. described and/or illustrated herein. Additionally, in some embodiments, any of the nodes, compute nodes, devices, appliances, IoT nodes, IoT devices, IoT appliances, gateways, IoT gateways, edge devices, and/or IoT edge devices, for example, can operate and implement any of the techniques described and/or illustrated herein, either as a group or individually. In some embodiments, any of these elements or groups of these elements such as devices, appliances, IoT devices, IoT appliances, gateways, IoT gateways, edge devices, and/or IoT edge devices, for example, can participate with each other as a larger group to implement a node or a compute node as described and/or illustrated herein.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Examples may include subject matter such as a method, means for performing acts of the method, at least one machine-readable medium including instructions that, when performed by a machine cause the machine to performs acts of the method, or of an apparatus or system for operating a network for a data market and exchange, according to embodiments and examples described herein.

The techniques described herein may be used to implement any number of IoT networks for various purposes. Additional applications may be implemented.

Example 1 includes an apparatus that uses a blockchain to agree on a time in an information exchange network. A first node includes a processor communicatively coupled to a storage device including instructions. When executed by the processor, the instructions cause the processor to verify a time estimate from each of one or more other node, to determine a time match of a time estimate of the first node with the time estimates from the one or more other node, and if the time match is determined, to commit to the blockchain a transaction that includes a time stamp.

In Example 2, the subject matter of Example 1 optionally includes the storage device including instructions that when executed by the processor, cause the processor to if the time match is not determined, update the time estimate of the first node, and retry the transaction. The transaction can be retried by verifying the time estimate from each of the one or more other node, determining a time match of the updated time estimate of the first node with the time estimates from each of the one or more other node, and if the time match is determined, then committing to the blockchain a transaction that includes a time stamp.

In Example 3, the subject matter of any one or more of Examples 1-2 optionally includes instructions that when executed by the processor, cause the processor to, before retrying the transaction, commit to the blockchain a transaction that captures the time estimate update.

In Example 4, the subject matter of any one or more of Examples 1-3 optionally includes wherein the time match is determined if the time estimate of the first node matches with a majority of the time estimates from the one or more other node.

In Example 5, the subject matter of any one or more of Examples 1-4 optionally includes wherein the time match is determined if the time estimate of the first node is within a time tolerance of the time estimate of the one or more other nodes.

In Example 6, the subject matter of any one or more of Examples 1-5 optionally includes the storage device including instructions that when executed by the processor, cause the processor to compute a block hash using an intersection of time intervals, and to commit a transaction to the blockchain in response to the computed block hash.

In Example 7, the subject matter of any one or more of Examples 1-6 optionally includes wherein the time intervals include time intervals from each of the one or more other nodes.

In Example 8, the subject matter of any one or more of Examples 1-7 optionally inclues the storage device including instructions that when executed by the processor, cause the processor to perform a trusted delete on the blockchain when a period of time has expired for content in the blockchain.

In Example 9, the subject matter of any one or more of Examples 1-8 optionally includes the storage device including instructions that when executed by the processor, cause the processor to count and track a number of copies of content in the blockchain.

Example 10 includes at least one computer readable storage medium having instructions stored thereon, the instructions when executed on a first compute node in a network, cause the first compute node to verify a time estimate from each of one or more other node, to determine a time match of a time estimate of the first node with the time estimates from the one or more other node, and to, if the time match is determined, commit to a blockchain a transaction that includes a time stamp.

In Example 11, the subject matter of Example 10 optionally includes the instructions when executed on the first compute node, cause the first compute node to, if the time match is not determined, update the time estimate of the first node and retry the transaction. The transaction may be retried by verifying the time estimate from each of the one or more other node, determining a time match of the updated time estimate of the first node with the time estimates from each of the one or more other node, and, if the time match is determined, committing to the blockchain a transaction that includes a time stamp.

In Example 12, the subject matter of any one or more of Examples 10-11 optionally includes the instructions when executed on the first compute node, cause the first compute node to, before retrying the transaction, commit to the blockchain a transaction that captures the time estimate update.

In Example 13, the subject matter of any one or more of Examples 10-12 optionally includes wherein the time match is determined if the time estimate of the first node matches with a majority of the time estimates from the one or more other node.

In Example 14, the subject matter of any one or more of Examples 10-13 optionally includes wherein the time match is determined if the time estimate of the first node is within a time tolerance of the time estimate of the one or more other nodes.

In Example 15, the subject matter of any one or more of Examples 10-14 optionally includes the instructions when executed on the first compute node, cause the first compute node to compute a block hash using an intersection of time intervals, and to commit a transaction to the blockchain in response to the computed block hash.

In Example 16, the subject matter of any one or more of Examples 10-15 optionally includes wherein the time intervals include time intervals from each of the one or more other nodes.

In Example 17, the subject matter of any one or more of Examples 10-16 optionally includes the instructions when executed on the first compute node, cause the first compute node to perform a trusted delete on the blockchain when a period of time has expired for content in the blockchain.

In Example 18, the subject matter of any one or more of Examples 10-17 optionally includes the instructions when executed on the first compute node, cause the first compute node to count and track a number of copies of content in the blockchain.

Example 19 includes a computer implemented method for using a blockchain to agree on a time in an information exchange network, including determining a time estimate of a first node, verifying a time estimate from each of one or more other node, determining a time match of a time estimate of the first node with the time estimates from the one or more other node, and if the time match is determined, committing to the blockchain a transaction that includes a time stamp.

In Example 20, the subject matter of Example 19 optionally includes, if the time match is not determined, updating the time estimate of the first node, and retrying the transaction. The transaction can be retried by verifying the time estimate from each of the one or more other node, determining a time match of the updated time estimate of the first node with the time estimates from each of the one or more other node, and, if the time match is determined, committing to the blockchain a transaction that includes a time stamp.

In Example 21, the subject matter of any one or more of Examples 19-20 optionally includes before retrying the transaction, committing to the blockchain a transaction that captures the time estimate update.

In Example 22, the subject matter of any one or more of Examples 19-21 optionally includes determining the time match if the time estimate of the first node matches with a majority of the time estimates from the one or more other node.

In Example 23, the subject matter of any one or more of Examples 19-22 optionally includes determining the time match if the time estimate of the first node is within a time tolerance of the time estimate of the one or more other nodes.

In Example 24, the subject matter of any one or more of Examples 19-23 optionally includes computing a block hash using an intersection of time intervals, and committing a transaction to the blockchain in response to the computed block hash.

In Example 25, the subject matter of any one or more of Examples 19-24 optionally includes wherein the time intervals include time intervals from each of the one or more other nodes.

In Example 26, the subject matter of any one or more of Examples 19-25 optionally includes performing a trusted delete on the blockchain when a period of time has expired for content in the blockchain.

In Example 27, the subject matter of any one or more of Examples 19-26 optionally includes counting and tracking a number of copies of content in the blockchain.

Example 28 is a system configured to perform operations of any one or more of Examples 1-27.

Example 29 is a method for performing operations of any one or more of Examples 1-27.

Example 30 is at least one machine readable storage medium including instructions that, when executed by a machine cause the machine to perform the operations of any one or more of Examples 1-27.

Example 31 is a system comprising means for performing the operations of any one or more of Examples 1-27.

Example 32 includes an apparatus including means to perform a method as in any other example.

Example 33 includes machine-readable storage including machine-readable instructions, when executed, to implement a method or realize an apparatus as in any other example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein.

Furthermore, well-known features may be omitted or simplified in order not to obscure the described embodiments. Various examples may be given throughout this description. These are merely descriptions of specific embodiments. The scope or meaning of the claims is not limited to the examples given.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter may be practiced with various computer system configurations, including multiprocessor or multiple-core processor systems, minicomputers, mainframe computers, as well as pervasive or miniature computers or processors that may be embedded into virtually any device. Embodiments of the disclosed subject matter may also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

In the above Detailed Description, various features may be grouped together to streamline the disclosure. However, the claims may not set forth every feature disclosed herein as embodiments may feature a subset of said features. Further, embodiments may include fewer features than those disclosed in a particular example.

What is claimed is:

1. An apparatus for using a blockchain to agree on a time in an information exchange network, comprising:
    a first node of the blockchain having a processor communicatively coupled to a storage device including instructions that when executed by the processor, cause the processor to:
        determine whether a threshold number of one or more other node in the blockchain is synchronized with a current time estimate from the one or more other node, wherein the determination is performed by comparing intersection intervals of clocks broadcast from the one or more other node;
        determine a time match of a time estimate of the first node with the current time estimate from the one or more other node, wherein the determination is performed by comparing intersection intervals of clocks broadcast from the one or more other node and the time estimate of the first node, and wherein the time estimate of the first node is to be recorded in a first transaction;
        determine whether the first node is on a permit list;
        if the time match is determined based on the comparing and the first node is on the permit list, then commit to the blockchain the first transaction that includes a time stamp of the time estimate of the first node and a hash of a previous block that uses the time stamp as part of a hash algorithm used to compute the hash; and
        if the time match is not determined based on the comparing and the first node is on the permit list:
            obtain a time stamp value from the blockchain;
            obtain a current time from a clock at the first node;
            compare the time stamp value from the blockchain with the current time to obtain a result;
            modify the clock of the first node with a modified time estimate based, at least in part, on the result;
            commit to the blockchain a second transaction that captures the modified time estimate as part of the second transaction for time synchronization recordkeeping; and
            retry the first transaction.

2. The apparatus of claim 1, wherein the time match is determined if the time estimate of the first node matches with a majority of the time estimates from the one or more other node.

3. The apparatus of claim 1, wherein the time match is determined if the time estimate of the first node is within a time tolerance of the time estimate of the one or more other node.

4. The apparatus of claim 1, the storage device including instructions that when executed by the processor, cause the processor to:
    compute a block hash using an intersection of time intervals; and
    commit a transaction to the blockchain in response to the computed block hash.

5. The apparatus of claim 4, wherein the time intervals include time intervals from the one or more other node.

6. The apparatus of claim 1, the storage device including instructions that when executed by the processor, cause the processor to:
    perform a trusted delete on the blockchain when a period of time has expired for content in the blockchain.

7. The apparatus of claim 1, wherein the blockchain includes a number of copies of content, the storage device including instructions that when executed by the processor, cause the processor to:
   count and track the number of copies of content in the blockchain.

8. The apparatus of claim 1, wherein the one or more other node is from a blockchain mining group.

9. At least one non-transitory computer readable storage medium having instructions stored thereon for using a blockchain to agree on a time in a blockchain network, the instructions when executed on a first node in the blockchain network, cause the first node to:
   determine whether a threshold number of one or more other node in the blockchain is synchronized with a current time estimate from the one or more other node, wherein the determination is performed by comparing intersection intervals of clocks broadcast from the one or more other node;
   determine a time match of a time estimate of the first node with the current time estimate from the one or more other node, wherein the determination is performed by comparing intersection intervals of clocks broadcast from the one or more other node and the time estimate of the first node, and wherein the time estimate of the first node is to be recorded in a first transaction;
   determine whether the first node is on a permit list;
   if the time match is determined based on the comparing and the first node is on the permit list, then commit to the blockchain the first transaction that includes a time stamp of the time estimate of the first node and a hash of a previous block that uses the time stamp as part of a hash algorithm used to compute the hash; and
   if the time match is not determined based on the comparing and the first node is on the permit list:
      obtain a time stamp value from the blockchain;
      obtain a current time from a clock at the first node;
      compare the time stamp value from the blockchain with the current time to obtain a result;
      modify the clock of the first node with a modified time estimate based, at least in part, on the result;
      commit to the blockchain a second transaction that captures the modified time estimate as part of the second transaction for time synchronization recordkeeping; and
      retry the first transaction.

10. The at least one non-transitory computer readable medium of claim 9, wherein the time match is determined if the time estimate of the first node matches with a majority of the time estimates from the one or more other node.

11. The at least one non-transitory computer readable medium of claim 9, wherein the time match is determined if the time estimate of the first node is within a time tolerance of the time estimate of the one or more other node.

12. The at least one non-transitory computer readable medium of claim 9, the instructions when executed on the first node, cause the first node to:
   compute a block hash using an intersection of time intervals; and
   commit a transaction to the blockchain in response to the computed block hash.

13. The at least one non-transitory computer readable medium of claim 12, wherein the time intervals include time intervals from the one or more other node.

14. The at least one non-transitory computer readable medium of claim 9, the instructions when executed on the first node, cause the first node to:
   perform a trusted delete on the blockchain when a period of time has expired for content in the blockchain.

15. The at least one non-transitory computer readable medium of claim 9, wherein the blockchain includes a number of copies of content, the instructions when executed on the first node, cause the first node to:
   count and track the number of copies of content in the blockchain.

16. A computer implemented method for using a blockchain to agree on a time in an information exchange network, comprising:
   determining whether a threshold number of one or more other node in the blockchain is synchronized with a current time estimate from the one or more other node, wherein the determination is performed by comparing intersection intervals of clocks broadcast from the one or more other node;
   determining whether a first node is on a permit list;
   determining a time match of a time estimate of the first node with the current time estimate from the one or more other node, wherein the determination is performed by comparing intersection intervals of clocks broadcast from the one or more other node and the time estimate of the first node, and wherein the time estimate of the first node is to be recorded in a first transaction;
   if the time match is determined based on the comparing and the first node is on the permit list, then committing to the blockchain the first transaction that includes a time stamp of the time estimate of the first node and a hash of a previous block that uses the time stamp as part of a hash algorithm used to compute the hash; and
   if the time match is not determined based on the comparing and the first node is on the permit list:
      obtaining a time stamp value from the blockchain;
      obtaining a current time from a clock at the first node;
      comparing the time stamp value from the blockchain with the current time to obtain a result;
      modifying the clock of the first node with a modified time estimate based, at least in part, on the result;
      committing to the blockchain a second transaction that captures the modified time estimate as part of the second transaction for time synchronization recordkeeping; and
      retrying the first transaction.

17. The method of claim 16, comprising determining the time match if the time estimate of the first node matches with a majority of the time estimates from the one or more other node.

18. The method of claim 16, comprising determining the time match if the time estimate of the first node is within a time tolerance of the time estimate of the one or more other node.

19. The method of claim 16, comprising:
   computing a block hash using an intersection of time intervals; and
   committing a transaction to the blockchain in response to the computed block hash.

20. The method of claim 16, wherein the time intervals include time intervals from the one or more other node.

21. The method of claim 16, comprising:
   performing a trusted delete on the blockchain when a period of time has expired for content in the blockchain.

22. The method of claim 16, wherein the blockchain includes a number of copies of content, the method comprising:
 counting and tracking the number of copies of content in the blockchain.

\* \* \* \* \*